(12) United States Patent
Ford et al.

(10) Patent No.: US 7,528,770 B2
(45) Date of Patent: May 5, 2009

(54) METHOD FOR POSITIONING USING GPS IN A RESTRICTIVE COVERAGE ENVIRONMENT

(75) Inventors: Thomas J. Ford, Calgary (CA); Sandy Kennedy, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 52 days.

(21) Appl. No.: 11/180,374

(22) Filed: Jul. 13, 2005

(65) Prior Publication Data

US 2006/0012516 A1 Jan. 19, 2006

Related U.S. Application Data

(60) Provisional application No. 60/588,099, filed on Jul. 15, 2004.

(51) Int. Cl.
*G01S 5/14* (2006.01)
(52) U.S. Cl. .................................. 342/357.04
(58) Field of Classification Search ............ 342/357.01, 342/357.12, 357.04
See application file for complete search history.

(56) References Cited

U.S. PATENT DOCUMENTS

| | | | |
|---|---|---|---|
| 5,583,513 A | 12/1996 | Cohen | |
| 5,781,156 A | 7/1998 | Krasner | |
| 5,828,336 A | 10/1998 | Yunck et al. | |
| 6,728,637 B2 | 4/2004 | Ford et al. | |
| 6,975,266 B2 * | 12/2005 | Abraham et al. | 342/357.02 |
| 7,117,094 B2 * | 10/2006 | Fenton | 702/14 |
| 2005/0001762 A1 * | 1/2005 | Han et al. | 342/357.04 |

OTHER PUBLICATIONS

Canadian Action No. 0601-08106, *Aram Systems Ltd.* v. *NovAtel Inc. and Patrick Fenton*, Statement of Claim, dated Jul. 6, 2006.

(Continued)

*Primary Examiner*—Thomas H Tarcza
*Assistant Examiner*—Nga X Nguyen
(74) *Attorney, Agent, or Firm*—Cesari and McKenna, LLP; Patricia A. Sheehan

(57) ABSTRACT

A system consisting of a base GPS receiver with a clear view of the sky, one or more remote GPS receivers with restricted views of the sky and a processing center that batch processes range information provided by the GPS receivers determines the positions of the remote GPS receivers to within tight tolerances. The base GPS receiver and the remote GPS receivers produce range information based on the satellite signals that the respective receivers can track at a given time, and provide the range information to the processing center. The range information includes both code and carrier measurements for each of the signals that are being tracked by the respective GPS receivers. The center collects the range information over an extended period of time, for example, hours, days or weeks, and then batch processes the collected information in multiple passes through the data, to calculate the precise latitude, longitude and height of the receiver. The center batch processes the data using a floating ambiguity filter that, after a first pass through the data, is initialized with the position calculated in an earlier pass. The center also calculates the quality of the collected range information by fixing the position and position covariance of the floating ambiguity filter and using double differences with the base GPS receiver measurements, to ensure that the information used in subsequent position calculations is sufficiently reliable.

19 Claims, 3 Drawing Sheets

OTHER PUBLICATIONS

Canadian Action No. 0601-08106, *Aram Systems Ltd.* v. *NovAtel Inc. and Patrick Fenton*, Amended Statement of Claim, dated Dec. 21, 2006.

Canadian Action No. 0601-08106, *Aram Systems Ltd.* v. *NovAtel Inc. and Patrick Fenton*, Further Amended Statement of Claim, dated Sep. 11, 2007.

Canadian Action No. 0601-08106, *Aram Systems Ltd.* v. *NovAtel Inc. and Patrick Fenton*, Affidavit of Werner Gartner, sworn Jul. 17, 2006 re: Rule 552(2) of the Alberta Rules of Court, dated Jul. 17, 2006.

Canadian Action No. 0601-08106, *Aram Systems Ltd.* v. *NovAtel Inc. and Patrick Fenton*, Mandatory Injunction, Notice of Motion of ARAM Systems returnable Sep. 13, 2006, dated Aug. 14, 2006; Amended Notice of Motion of Aram Systems returnable Sep. 12, 2006, dated Sep. 5, 2006.

Canadian Action No. 0601-08106, *Aram Systems Ltd.* v. *NovAtel Inc. and Patrick Fenton*, Affidavit of Virgil Barfield sworn Aug. 2, 2006, filed Aug. 14, 2006.

Canadian Action No. 0601-08106, *Aram Systems Ltd.* v. *NovAtel Inc. and Patrick Fenton*, Affidavit of David Heidebrecht sworn Aug. 11, 2006, dated Aug. 14, 2006.

Canadian Action No. 0601-08106, *Aram Systems Ltd.* v. *NovAtel Inc. and Patrick Fenton*, Affidavit of Michael O. Sutton (Expert) sworn Aug. 10, 2006, dated Aug. 14, 2006 (w/ Exhibits)

Canadian Action No. 0601-08106, *Aram Systems Ltd.* v. *NovAtel Inc. and Patrick Fenton*, Supplementary Affidavit of Michael O. Sutton (Expert) sworn Aug. 25, 2006 (w/ Exhibits).

Canadian Action No. 0601-08106, *Aram Systems Ltd.* v. *NovAtel Inc. and Patrick Fenton*, Affidavit of Jerald Harmon sworn Aug. 10, 2006, dated Aug. 14, 2006 (w/ Exhibits).

Canadian Action No. 0601-08106, *Aram Systems Ltd.* v. *NovAtel Inc. and Patrick Fenton*, Statement of Defence and Counterclaim, dated Aug. 25, 2006.

Canadian Action No. 0601-08106, *Aram Systems Ltd.* v. *NovAtel Inc. and Patrick Fenton*, Amended Statement of Defence and Amended Counterclaim, dated Apr. 12, 2007.

Canadian Action No. 0601-08106, *Aram Systems Ltd.* v. *NovAtel Inc. and Patrick Fenton*, Amended Amended Statement of Defence and Amended Amended Counterclaim, dated May 29, 2007.

Canadian Action No. 0601-08106, *Aram Systems Ltd.* v. *NovAtel Inc. and Patrick Fenton*, Amended, Amended Amended Statement of Defence and Amended Amended Amended Counterclaim, dated Sep. 12, 2007.

Canadian Action No. 0601-08106, *Aram Systems Ltd.* v. *NovAtel Inc. and Patrick Fenton*, Summary Judgment, Notice of Motion of NovAtel returnable on Sep. 12, 2006, dated Aug. 25, 2007.

Canadian Action No. 0601-08106, *Aram Systems Ltd.* v. *NovAtel Inc. and Patrick Fenton*, Summary Judgment, Amended Notice of Motion of NovAtel returnable on Sep. 13, 2006, dated Aug. 28, 2007.

Canadian Action No. 0601-08106, *Aram Systems Ltd.* v. *NovAtel Inc. and Patrick Fenton*, Affidavit of Patrick C. Fenton sworn Aug. 25, 2006, dated Aug. 25, 2006.

Canadian Action No. 0601-08106, *Aram Systems Ltd.* v. *NovAtel Inc. and Patrick Fenton*, Affidavit of Nicholas Schubert sworn Aug. 25, 2006, dated Aug. 25, 2006.

Canadian Action No. 0601-08106, *Aram Systems Ltd.* v. *NovAtel Inc. and Patrick Fenton*, Affidavit of Farlin Halsey sworn Aug. 25, 2006, dated Aug. 25, 2006.

Canadian Action No. 0601-08106, *Aram Systems Ltd.* v. *NovAtel Inc. and Patrick Fenton*, Affidavit of David M. Quinlan (Expert) sworn Aug. 25, 2006, dated Aug. 25, 2006.

Canadian Action No. 0601-08106, *Aram Systems Ltd.* v. *NovAtel Inc. and Patrick Fenton*, Cases Referred to in the Affidavit of David M. Quinlan Sworn Aug. 25, 2006.

Canadian Action No. 0601-08106, *Aram Systems Ltd.* v. *NovAtel Inc. and Patrick Fenton*, Cross-examination taken Aug. 29, 2006 on Affidavit of David Heidebrecht sworn Aug. 11, 2006; copy filed Jan. 8, 2007.

Canadian Action No. 0601-08106, *Aram Systems Ltd.* v. *NovAtel Inc. and Patrick Fenton*, Cross-examination taken Aug. 30, 2006 on Affidavit of Patrick C. Fenton sworn Aug. 25, 2006.

Canadian Action No. 0601-08106, *Aram Systems Ltd.* v. *NovAtel Inc. and Patrick Fenton*, Cross-examination taken Aug. 30, 2006 on Affidavit of Jerald Harmon sworn Aug. 10, 2006.

Canadian Action No. 0601-08106, *Aram Systems Ltd.* v. *NovAtel Inc. and Patrick Fenton*, Cross-examination taken Aug. 31, 2006 on Affidavit of David Quinlan sworn Aug. 25, 2006.

Canadian Action No. 0601-08106, *Aram Systems Ltd.* v. *NovAtel Inc. and Patrick Fenton*, Cross-examination taken Sep. 1, 2006 on Affidavits of Michael Sutton sworn Aug. 14 and Aug. 25, 2006; copy filed Jan. 8, 2007.

Canadian Action No. 0601-08106, *Aram Systems Ltd.* v. *NovAtel Inc. and Patrick Fenton*, Cross-examination taken Sep. 4, 2006 on Affidavit of Norbert Schubert sworn Aug. 25, 2006.

Canadian Action No. 0601-08106, *Aram Systems Ltd.* v. *NovAtel Inc. and Patrick Fenton*, Mandatory Injunction, Brief of ARAM Systems to be heard by Special Application on Sep. 12, 2006 at 9:00 a.m. before the Honourable Madame Justice B.E.C. Romaine, dated Sep. 8, 2006.

Canadian Action No. 0601-08106, *Aram Systems Ltd.* v. *NovAtel Inc. and Patrick Fenton*, Injunction, Plaintiff's (Moving Party's) Book of Exhibits to Cross-Examinations, dated Sep. 8, 2006.

Canadian Action No. 0601-08106, *Aram Systems Ltd.* v. *NovAtel Inc. and Patrick Fenton*, Summary Judgment, Brief of Respondents (ARAM Systems, Heidebrecht and Chamberlain) Special Application on Sep. 12, 2006 at 10:00 a.m. before the Honourable B.E.C. Romaine, dated Sep. 8, 2006.

Canadian Action No. 0601-08106, *Aram Systems Ltd.* v. *NovAtel Inc. and Patrick Fenton*, Summary Judgment, Supplemental Affidavit of Patrick C. Fenton sworn Sep. 12, 2006.

Canadian Action No. 0601-08106, *Aram Systems Ltd.* v. *NovAtel Inc. and Patrick Fenton*, Injunction and Summary Judgment, Written Brief of NovAtel Inc. and Patrick C. Fenton for the Special Chambers Application scheduled for Sep. 12, 2006 at 9:00 a.m. re: Order striking Statement of Claim (Limitations Act) and/or dismiss Plaintiff's motion for interim mandatory relief, dated Sep. 8, 2006..

Canadian Action No. 0601-08106, *Aram Systems Ltd.* v. *NovAtel Inc. and Patrick Fenton*, Book of Authorities of NovAtel and Patrick C. Fenton for the Special Chambers Application scheduled for Sep. 12, 2006, dated Sep. 8, 2006..

Canadian Action No. 0601-08106, *Aram Systems Ltd.* v. *NovAtel Inc. and Patrick Fenton*, Book of Exhibits to Cross-Examinations of NovAtel Inc. and Patrick C. Fenton, Special Chambers Application - Sep. 12, 2006.

Canadian Action No. 0601-08106, *Aram Systems Ltd.* v. *NovAtel Inc. and Patrick Fenton*, Excerpts from Cross-Examination Relied Upon by of NovAtel Inc. and Patrick C. Fenton, Special Chambers Application - Sep. 12, 2006.

Canadian Action No. 0601-08106, *Aram Systems Ltd.* v. *NovAtel Inc. and Patrick Fenton*, Cross-examination taken Sep. 15, 2006 on Affidavit of Patrick Fenton sworn, dated Sep. 15, 2006.

Canadian Action No. 0601-08106, *Aram Systems Ltd.* v. *NovAtel Inc. and Patrick Fenton*, Affidavit of Richard P. Bauer, sworn Sep. 18, 2006, dated Sep. 20. 2006.

Canadian Action No. 0601-08106, *Aram Systems Ltd.* v. *NovAtel Inc. and Patrick Fenton*, Supplemental Affidavit of Richard P. Bauer sworn Sep. 18, 2006, dated Sep. 20. 2006.

Canadian Action No. 0601-08106, *Aram Systems Ltd.* v. *NovAtel Inc. and Patrick Fenton*, Affidavit of Harry F. Manbeck, Jr. sworn Sep. 20, 2006.

Canadian Action No. 0601-08106, *Aram Systems Ltd.* v. *NovAtel Inc. and Patrick Fenton*, Supplemental Affidavit of David M. Quinlan sworn Sep. 20, 2006.

Canadian Action No. 0601-08106, *Aram Systems Ltd.* v. *NovAtel Inc. and Patrick Fenton*, Summary Judgment, Plaintiff's Further Book of Exhibits to Cross-Examination of Patrick C. Fenton, dated Sep. 20, 2006.

Canadian Action No. 0601-08106, *Aram Systems Ltd.* v. *NovAtel Inc. and Patrick Fenton*, Supplementary Written Brief of NovAtel Inc. and Patrick C. Fenton on the Issues Raised in the Affidavit Evidence filed on Sep. 20, 2006, dated Sep. 25, 2006.

Canadian Action No. 0601-08106, *Aram Systems Ltd.* v. *NovAtel Inc. and Patrick Fenton*, Injunction, Supplemental Brief of ARAM Systems re: Plaintiff's Motion for Interim Mandatory Injunction before the Honorable Madame Justice B.E.C. Romaine, dated Sep. 25, 2007.

Canadian Action No. 0601-08106, *Aram Systems Ltd.* v. *NovAtel Inc. and Patrick Fenton*, Summary Judgment, Supplemental Brief of ARAM Systems re: NovAtel's Application for Summary Judgment, dated Sep. 25, 2006.

Canadian Action No. 0601-08106, *Aram Systems Ltd.* v. *NovAtel Inc. and Patrick Fencton*, Summary Judgment, Supplementary Written Brief of NovAtel Inc. and Patrick C. Fenton with respect to the Application for Summary Judgment, dated Sep. 25, 2006.

Canadian Action No. 0601-08106, *Aram Systems Ltd.* v. *NovAtel Inc. and Patrick Fencton*, Reply by ARAM Systems Ltd. to Statement of Defence and Defence to Counterclaim, dated Sep. 25, 2006.

Canadian Action No. 0601-08106, *Aram Systems Ltd.* v. *NovAtel Inc. and Patrick Fencton*, Amended Reply by ARAM Systems Ltd. to Amended Amended Statement of Defence, dated Jun. 15, 2007.

Canadian Action No. 0601-08106, *Aram Systems Ltd.* v. *NovAtel Inc. and Patrick Fenton*, Further Amended Reply by ARAM Systems Ltd. to Amended Amended Amended Statement of Defence, dated Sep. 17, 2007.

Canadian Action No. 0601-08106, *Aram Systems Ltd.* v. *NovAtel Inc. and Patrick Fenton*, Reasons for Judgment of Madame Justice B.E. C. Romaine dated Sep. 28, 2006.

Canadian Action No. 0601-08106, *Aram Systems Ltd.* v. *NovAtel Inc. and Patrick Fencton*, Civil Notice of Appeal of Madame Justice Romain's Order of Sep. 28, 2006 refusing to grant an interim mandatory order.

Canadian Action No. 0601-08106, *Aram Systems Ltd.* v. *NovAtel Inc. and Patrick Fencton*, Injunction, Court of Appeal - Notice of Motion of ARAM Systems before Justice O'Brien returnable on Sep. 28, 2006 seeking an Order permitting and directing a single judge of the Court of Appeal hear an application returnable Sep. 29, 2006 for interim relief against NovAtel Inc. and Patrick Fenton pending the hearing of the appeal of Madame Justice Romaine's Order dated Sep. 28, 2006.

Canadian Action No. 0601-08106, *Aram Systems Ltd.* v. *NovAtel Inc. and Patrick Fencton*, Injunction, Court of Appeal - Notice of Motion of ARAM Systems returnable on Sep. 29, 2006 seeking an Order confirming a single judge has jurisdiction to hear this application and seeking interim relief against NovAtel Inc. and Patrick Fenton pending the hearing of the appeal of Madame Justice Romaine's Order dated Sep. 28, 2006; filed Sep. 28, 2006.

Canadian Action No. 0601-08106, *Aram Systems Ltd.* v. *NovAtel Inc. and Patrick Fencton*, Injunction, Court of Appeal - Authorities before the Honourable Mr. Justice O'Brien.

Canadian Action No. 0601-08106, *Aram Systems Ltd.* v. *NovAtel Inc. and Patrick Fenton*, Injunction, Court of Appeal - Brief of NovAtel Inc. and Patrick C. Fenton to the Motion of ARAM Systems Inc. for a Hearing for a Stay, dated Sep. 28, 2006.

Canadian Action No. 0601-08106, *Aram Systems Ltd.* v. *NovAtel Inc. and Patrick Fencton*, Injunction, Court of Appeal - Submissions of the Respondents NovAtel Inc. and Patrick C. Fenton to the Motion of ARAM Systems Inc. for a Stay - Hearing before the Honourable Mr. Justice C.D. O'Brien on Sep. 29, 2006 at 2:30 p.m.

Canadian Action No. 0601-08106, *Aram Systems Ltd.* v. *NovAtel Inc. and Patrick Fenton*, Injunction, Court of Appeal - Additional Authorities of NovAtel Inc. and Patrick C. Fenton to the Motion of ARAM Systems for a Stay Hearing before Justice O'Brien - Sep. 29, 2006.

Canadian Action No. 0601-08106, *Aram Systems Ltd.* v. *NovAtel Inc. and Patrick Fenton*, Affidavit of Records of NovAtel Inc. and Patrick C. Fenton sworn Oct. 16, 2006.

Canadian Action No. 0601-08106, *Aram Systems Ltd.* v. *NovAtel Inc. and Patrick Fenton*, Affidavit of Records of ARAM Systems Ltd. (Virgil Barfield) sworn Oct. 13, 2006.

Canadian Action No. 0601-08106, *Aram Systems Ltd.* v. *NovAtel Inc. and Patrick Fenton*, Affidavit of Records of Norman David Heidebrecht sworn Oct. 13, 2006.

Canadian Action No. 0601-08106, *Aram Systems Ltd.* v. *NovAtel Inc. and Patrick Fenton*, Affidavit of Records of Donald G. Chamberlain sworn Oct. 16, 2006.

Canadian Action No. 0601-08106, *Aram Systems Ltd.* v. *NovAtel Inc. and Patrick Fenton*, Examination for Discovery of Patrick Fenton (NovAtel) on Nov. 14, 2006.

Canadian Action No. 0601-08106, *Aram Systems Ltd.* v. *NovAtel Inc. and Patrick Fenton*, Examination for Discovery of Zelko Bacanek (ARAM) on Nov. 15, 2006.

Canadian Action No. 0601-08106, *Aram Systems Ltd.* v. *NovAtel Inc. and Patrick Fenton*, Examination for Discovery of Terry Wood (ARAM) on Nov. 15, 2006.

Canadian Action No. 0601-08106, *Aram Systems Ltd.* v. *NovAtel Inc. and Patrick Fenton*, Examination for Discovery of Donald Chamberlain (ARAM) on Nov. 16, 2006.

Canadian Action No. 0601-08106, *Aram Systems Ltd.* v. *NovAtel Inc. and Patrick Fenton*, Examination for Discovery of Jonathan Ladd (NovAtel) on Nov. 17, 2006.

Canadian Action No. 0601-08106, *Aram Systems Ltd.* v. *NovAtel Inc. and Patrick Fenton*, Examination for Discovery of Jerald Harmon (ARAM) on Nov. 20, 2006.

Canadian Action No. 0601-08106, *Aram Systems Ltd.* v. *NovAtel Inc. and Patrick Fenton*, Examination for Discovery of Virgil Barfield (ARAM) on Nov. 21, 2006.

Canadian Action No. 0601-08106, *Aram Systems Ltd.* v. *NovAtel Inc. and Patrick Fenton*, Examination for Discovery of Graham Purves (NovAtel) on Nov. 22, 2006.

Canadian Action No. 0601-08106, *Aram Systems Ltd.* v. *NovAtel Inc. and Patrick Fenton*, Examination for Discovery of Farlin Halsey (NovAtel) on Nov. 24, 2006.

Canadian Action No. 0601-08106, *Aram Systems Ltd.* v. *NovAtel Inc. and Patrick Fenton*, Examination for Discovery of Debora Klaus (NovAtel) on Nov. 27, 2006.

Canadian Action No. 0601-08106, *Aram Systems Ltd.* v. *NovAtel Inc. and Patrick Fenton*, Examination for Discovery of Nicholas Schubert (NovAtel) on Nov. 28-29, 2006.

Canadian Action No. 0601-08106, *Aram Systems Ltd.* v. *NovAtel Inc. and Patrick Fenton*, Examination for Discovery of David Heidebrecht (ARAM) on Nov. 30, 2006.

Canadian Action No. 0601-08106, *Aram Systems Ltd.* v. *NovAtel Inc. and Patrick Fenton*, Order of Madam Justice B.E.C. Romaine dated Dec. 6, 2006 amending Order dated Nov. 6, 2006.

Canadian Action No. 0601-08106, *Aram Systems Ltd.* v. *NovAtel Inc. and Patrick Fenton*, Examination for Discovery of Steve Duncombe (NovAtel) on Dec. 12, 2006.

Canadian Action No. 0601-08106, *Aram Systems Ltd.* v. *NovAtel Inc. and Patrick Fenton*, Brief Comment on Stuffco Decision by the Respondent/Plaintiff re: Defendant's Application for Summary Judgment; dated Dec. 15, 2006.

Canadian Action No. 0601-08106, *Aram Systems Ltd.* v. *NovAtel Inc. and Patrick Fenton*, Second Supplementary Written Brief of NovAtel with respect to the Application for Summary Judgment; dated Dec. 15, 2006.

Canadian Action No. 0601-08106, *Aram Systems Ltd.* v. *NovAtel Inc. and Patrick Fenton*, Continuation of Examination for Discovery of David Heidebrecht on Dec.18, 2006.

Canadian Action No. 0601-08106, *Aram Systems Ltd.* v. *NovAtel Inc. and Patrick Fenton*, Examination on Undertakings of Patrick Fenton (NovAtel) on Dec.19, 2006.

Canadian Action No. 0601-08106, *Aram Systems Ltd.* v. *NovAtel Inc. and Patrick Fenton*, Supplemental Affidavit of Patrick C. Fenton sworn Dec. 21, 2007.

Canadian Action No. 0601-08106, *Aram Systems Ltd.* v. *NovAtel Inc. and Patrick Fenton*, Bifurcation - Notice of Motion returnable Jan. 8 and 9, 2007 seeking an Order for a stay or bifurcation of the inventorship issues.

Canadian Action No. 0601-08106, *Aram Systems Ltd.* v. *NovAtel Inc. and Patrick Fenton*, Notice of Motion returnable Jan. 8, 2007 seeking an Order compelling answers to certain refused undertakings, dated Dec. 22, 2006.

Canadian Action No. 0601-08106, *Aram Systems Ltd.* v. *NovAtel Inc. and Patrick Fenton*, Affidavit of Donald G. Chamberlain sworn Dec. 19, 2006.

Canadian Action No. 0601-08106, *Aram Systems Ltd.* v. *NovAtel Inc. and Patrick Fenton*, Supplemental Affidavit of Donald G. Chamberlain sworn Dec. 20, 2006.

Canadian Action No. 0601-08106, *Aram Systems Ltd.* v. *NovAtel Inc. and Patrick Fenton*, written Brief of ARAM Systems with respect to compelling the Defendants to provide answers to certain refused undertakings to be heard by Special Application on Jan. 8, 2007, dated Dec. 22, 2007.

Canadian Action No. 0601-08106, *Aram Systems Ltd.* v. *NovAtel Inc. and Patrick Fenton*, Affidavit of Donald G. Chamberlain sworn Dec. 22, 2006.

Canadian Action No. 0601-08106, *Aram Systems Ltd.* v. *NovAtel Inc. and Patrick Fenton*, Second Supplemental Affidavit of Richard P. Bauer sworn Dec. 22, 2006.

Canadian Action No. 0601-08106, *Aram Systems Ltd.* v. *NovAtel Inc. and Patrick Fenton*, Reasons for Judgment of the Honourable Madam Justice B.E. Romaine dated Dec. 29, 2006 (summary judgment application).

Canadian Action No. 0601-08106, *Aram Systems Ltd.* v. *NovAtel Inc. and Patrick Fenton*, Order of Madam Justice B.E. Romaine dated Sep. 28, 2006 (dismissing injunction motion), dated Jan. 25, 2007.

Canadian Action No. 0601-08106, *Aram Systems Ltd.* v. *NovAtel Inc. and Patrick Fenton*, Judgment of Madam Justice B.E. Romaine dated Dec. 29, 2006 (summary judgment application), dated Jan. 25, 2007.

Canadian Action No. 0601-08106, *Aram Systems Ltd.* v. *NovAtel Inc. and Patrick Fenton*, Court of Appeal - Civil Notice of Appeal, dated Jan. 2, 2007.

Canadian Action No. 0601-08106, *Aram Systems Ltd.* v. *NovAtel Inc. and Patrick Fenton*, Court of Appeal - Proposed Content of Appeal Books dated Jan. 5, 2007.

Canadian Action No. 0601-08106, *Aram Systems Ltd.* v. *NovAtel Inc. and Patrick Fenton*, Order of Associate Chief Justice N.C. Wittmann dated Jan. 11, 2007 revising timetable and setting tentative trial date to Jun. 4 to 15, 2007, dated Jan. 12, 2007.

Canadian Action No. 0601-08106, *Aram Systems Ltd.* v. *NovAtel Inc. and Patrick Fenton*, Court of Appeal - Order of Mme. Justice Conrad, dated Jan. 4, 2007 amending timetable, dated Jan. 15, 2007.

Canadian Action No. 0601-08106, *Aram Systems Ltd.* v. *NovAtel Inc. and Patrick Fenton*, Court of Appeal - Appeal Books (7 vols.), dated Jan. 22, 2007.

Canadian Action No. 0601-08106, *Aram Systems Ltd.* v. *NovAtel Inc. and Patrick Fenton*, Court of Appeal - Factum of ARAM Systems Ltd. with respect to Reasons for Judgment of Madam Justice Romaine dated Dec. 29, 2006, dated Jan. 26, 2007.

Canadian Action No. 0601-08106, *Aram Systems Ltd.* v. *NovAtel Inc. and Patrick Fenton*, Court of Appeal - Respondent's Factum with respect to the Reasons for Judgment of Madam Justice Romaine dated Dec. 29, 2006 - B. Book of Authorities - vol. 1, C. Book of Authorities - vol. 2, dated Feb. 9, 2007.

Canadian Action No. 0601-08106, *Aram Systems Ltd.* v. *NovAtel Inc. and Patrick Fenton*, Court of Appeal - Memorandum of Judgment dated Mar. 21, 2007.

Canadian Action No. 0601-08106, *Aram Systems Ltd.* v. *NovAtel Inc. and Patrick Fenton*, Cross-examination on Affidavit of Donald Gordon Chamberlain sworn Dec. 22, 2006 and taken on Apr. 5, 2007.

Canadian Action No. 0601-08106, *Aram Systems Ltd.* v. *NovAtel Inc. and Patrick Fenton*, Order of Associate Chief Justice Wittmann dated Mar. 30, 2007 re timetable for hearing of motion seeking answers on discovery and production of documents pertaining to such answers (Gowlings); bifurcation (McT) and appointment of new Case Management Judge (Gowlings), dated Apr. 10, 2007.

Canadian Action No. 0601-08106, *Aram Systems Ltd.* v. *NovAtel Inc. and Patrick Fenton*, Second Supplemental Affidavit of David M. Quinlan sworn Apr. 10, 2007.

Canadian Action No. 0601-08106, *Aram Systems Ltd.* v. *NovAtel Inc. and Patrick Fenton*, Appendix "A" to the Second Supplemental Affidavit of David M. Quinlan sworn Apr. 10, 2007.

Canadian Action No. 0601-08106, *Aram Systems Ltd.* v. *NovAtel Inc. and Patrick Fenton*, Amended Statement of Defence and Amended Counterclaim, dated Apr. 12, 2007.

Canadian Action No. 0601-08106, *Aram Systems Ltd.* v. *NovAtel Inc. and Patrick Fenton*, Bifurcation/Stay - Amended Notice of Motion returnable May 4, 2007 for stay and bifurcation, dated Apr. 10, 2007.

Canadian Action No. 0601-08106, *Aram Systems Ltd.* v. *NovAtel Inc. and Patrick Fenton*, Written Brief of NovAtel Inc. and Patrick C. Fenton with respect to their Application for a Stay of Proceedings (Special on May 4, 2007), dated Apr. 20, 2007.

Canadian Action No. 0601-08106, *Aram Systems Ltd.* v. *NovAtel Inc. and Patrick Fenton*, A. vol. 1 Book of Authorities (re: No. 98), B. vol. 2 Book of Authorities (re: No. 98), C. Book of Exhibits and Cross-Examinations Transcripts, dated Apr. 20, 2007.

Canadian Action No. 0601-08106, *Aram Systems Ltd.* v. *NovAtel Inc. and Patrick Fenton*, Written Brief of NovAtel Inc. and Patrick C. Fenton in response to ARAM System Ltd.'s Motion to Compel Answers to Certain Refused Undertakings (Special on May 4, 2007) dated Apr. 20, 2007.

Canadian Action No. 0601-08106, *Aram Systems Ltd.* v. *NovAtel Inc. and Patrick Fenton*, Notice of Motion for Order striking paragraphs from Amended Statement of Defence and Amended Counterclaim and with respect to attornment, returnable May 4, 2007, dated Apr. 20, 2007.

Canadian Action No. 0601-08106, *Aram Systems Ltd.* v. *NovAtel Inc. and Patrick Fenton*, Written Brief of Aram Systems with respect to an Application pursuant to Rule 131 to Strike Portions of the Amended Statement of Defence and Amended Counterclaim (Special on May 4, 2007), dated Apr. 20, 2007.

Canadian Action No. 0601-08106, *Aram Systems Ltd.* v. *NovAtel Inc. and Patrick Fenton*, Notice of Motion of ARAM Systems for an Order bifurcating liability and damages pursuant to Rule 221 returnable May 4, 2007, dated Apr. 25, 2007.

Canadian Action No. 0601-08106, *Aram Systems Ltd.* v. *NovAtel Inc. and Patrick Fenton*, Affidavit of Donald G. Chamberlain sworn Apr. 24, 2007, dated Apr. 25, 2007.

Canadian Action No. 0601-08106, *Aram Systems Ltd.* v. *NovAtel Inc. and Patrick Fenton*, Written Brief of ARAM SYSTEMS re: bifurcating liability and damages issues for Special Application on May 4, 2007, dated Apr. 25, 2007.

Canadian Action No. 0601-08106, *Aram Systems Ltd.* v. *NovAtel Inc. and Patrick Fenton*, Reply Brief of NovAtel with respect to the Application of ARAM Systems Ltd. pursuant to Rule 131 to Strike portions of the Amended Statement of Defence and Amended Counterclaim scheduled to be heard on May 4, 2007, dated Apr. 27, 2007.

Canadian Action No. 0601-08106, *Aram Systems Ltd.* v. *NovAtel Inc. and Patrick Fenton*, Written Brief of ARAM with respect to NovAtel's application to stay trial or bifurcate from trial issues as to inventorship, dated Apr. 27, 2007.

Canadian Action No. 0601-08106, *Aram Systems Ltd.* v. *NovAtel Inc. and Patrick Fenton*, Two Volumes of the book of Authorities re #107.

Canadian Action No. 0601-08106, *Aram Systems Ltd.* v. *NovAtel Inc. and Patrick Fenton*, COURT OF APPEAL - Certificate that ARAM's appeal has been struck from the list, dated May 1, 2007.

Canadian Action No. 0601-08106, *Aram Systems Ltd.* v. *NovAtel Inc. and Patrick Fenton*, Supplemental Written Brief of ARAM Systems with respect to NovAtel's application to stay trial or bifurcate from trial issues as to inventorship scheduled to be heard on May 4, 2007, dated May 2, 2007.

Canadian Action No. 0601-08106, *Aram Systems Ltd.* v. *NovAtel Inc. and Patrick Fenton*, Reply Brief of NovAtel with respect to Application of ARAM Systems Ltd. pursuant to Rule 221to bifurcate issues of damages and liability scheduled to be heard on May 10, 2007, dated May 7, 2007.

Canadian Action No. 0601-08106, *Aram Systems Ltd.* v. *NovAtel Inc. and Patrick Fenton*, Affidavit of Patrick C. Fenton sworn May 7, 2007 in support of application to adjourn trial from Jun. 2007 to the Fall of 2007.

Canadian Action No. 0601-08106, *Aram Systems Ltd.* v. *NovAtel Inc. and Patrick Fenton*, Notice of Motion of NovAtel scheduled for May 9, 2007 for an Order compelling ARAM to answer undertakings, dated May 7, 2007.

Canadian Action No. 0601-08106, *Aram Systems Ltd.* v. *NovAtel Inc. and Patrick Fenton*, Affidavit of Patrick C. Fenton sworn May 7, 2007 in support of application for an Order compelling ARAM to answer undertakings.

Canadian Action No. 0601-08106, *Aram Systems Ltd.* v. *NovAtel Inc. and Patrick Fenton*, Written Rebuttal Brief of ARAM Systems in Rebuttal to the Reply Submissions of NovAtel on ARAM's Motion to Bifurcate Issues of Liability and Damages to be heard on May 10, 2007, dated May 8, 2007.

Canadian Action No. 0601-08106, *Aram Systems Ltd.* v. *NovAtel Inc. and Patrick Fenton*, Book of Authorities of ARAM Systems in Rebuttal to the Reply Submissions of NovAtel on ARAM's Motion to Compel Answers to Certain Questions and Undertakings Refused to be heard on May 10, 2007, dated May 8, 2007.

Canadian Action No. 0601-08106, *Aram Systems Ltd.* v. *NovAtel Inc. and Patrick Fenton*, Transcript of Reasons for Judgment of Madam Justice Bensler delivered orally, dated May 10, 2007.

Canadian Action No. 0601-08106, *Aram Systems Ltd.* v. *NovAtel Inc. and Patrick Fenton*, Notice of Motion of NovAtel returnable May 16, 2007 seeking an Order adjourning the trial and completion of Examinations for Discovery and interlocutory proceedings, dated May 11, 2007.

Canadian Action No. 0601-08106, *Aram Systems Ltd.* v. *NovAtel Inc. and Patrick Fenton*, Affidavit of Christopher Chamberlain sworn May 14, 2007.

Canadian Action No. 0601-08106, *Aram Systems Ltd.* v. *NovAtel Inc. and Patrick Fenton*, Plaintiff's Written Reply to Motion of NovAtel Seeking adjournment of trial scheduled for Jun. 4-15, 2007 - Chambers application scheduled before Associate Chief Justice Wittmann on May 16, 2007, dated May 15, 2007.

Canadian Action No. 0601-08106, *Aram Systems Ltd.* v. *NovAtel Inc. and Patrick Fenton*, Notice to Admit Facts, dated May 16, 2007.

Canadian Action No. 0601-08106, *Aram Systems Ltd.* v. *NovAtel Inc. and Patrick Fenton*, Supplemental Notice to Admit Facts, dated May 16, 2007.

Canadian Action No. 0601-08106, *Aram Systems Ltd.* v. *NovAtel Inc. and Patrick Fenton*, Order of Justice P.M. Clark dated May 4, 2007 pursuant to Rule 131 to strike portions of Amended Statement of Defence, Transcript of Proceedings before Justice Clark on May 4, 2007, Transcript of Proceedings before Justice Clark on May 4, 2007, dated May 16, 2007.

Canadian Action No. 0601-08106, *Aram Systems Ltd.* v. *NovAtel Inc. and Patrick Fenton*, Transcript of Reason for Judgment of Madam Justice Bensler delivered orally on May 10. 2007.

Canadian Action No. 0601-08106, *Aram Systems Ltd.* v. *NovAtel Inc. and Patrick Fenton*, Second Supplemental Notice to Admit Facts, dated May 17, 2007.

Canadian Action No. 0601-08106, *Aram Systems Ltd.* v. *NovAtel Inc. and Patrick Fenton*, Reply to Notice to Admit Facts, dated May 25, 2007.

Canadian Action No. 0601-08106, *Aram Systems Ltd.* v. *NovAtel Inc. and Patrick Fenton*, Reply to Supplemental Notice to Admit Facts, dated May 25, 2007.

Canadian Action No. 0601-08106, *Aram Systems Ltd.* v. *NovAtel Inc. and Patrick Fenton*, Reply to Second Supplemental Notice to Admit Facts, dated May 25, 2007.

Canadian Action No. 0601-08106, *Aram Systems Ltd.* v. *NovAtel Inc. and Patrick Fenton*, Amended Amended Statement of Defence and Amended Amended Counterclaim, dated May 29, 2007.

Canadian Action No. 0601-08106, *Aram Systems Ltd.* v. *NovAtel Inc. and Patrick Fenton*, Order of Madam Justice S.M. Bensler dated May 10, 2007 bifurcating liability and damages at trial, dated May 31, 2007.

Canadian Action No. 0601-08106, *Aram Systems Ltd.* v. *NovAtel Inc. and Patrick Fenton*, Order of Associate Chief Justice Wittmann dated May 16, 2007, dated Jun. 1, 2007.

Canadian Action No. 0601-08106, *Aram Systems Ltd.* v. *NovAtel Inc. and Patrick Fenton*, Order of Associate Chief Justice Wittmann dated May 26, 2007, dated Jun. 1, 2007.

Canadian Action No. 0601-08106, *Aram Systems Ltd.* v. *NovAtel Inc. and Patrick Fenton*, Amended Reply by ARAM Systems Ltd. to Amended Amended Statement of Defence, dated Jun. 15, 2007.

Canadian Action No. 0601-08106, *Aram Systems Ltd.* v. *NovAtel Inc. and Patrick Fenton*, Written Brief of NovAtel regarding certain refused undertakings, special application before Justice S.M. Bensler in Chambers on Jun. 18, 2007, dated Jun. 15, 2007.

Canadian Action No. 0601-08106, *Aram Systems Ltd.* v. *NovAtel Inc. and Patrick Fenton*, Written Brief of ARAM Systems Ltd. regarding certain undertakings refused, special application before Justice S.M. Bensler in Chambers on Jun. 18, 2007, dated Jun. 15, 2007.

Canadian Action No. 0601-08106, *Aram Systems Ltd.* v. *NovAtel Inc. and Patrick Fenton*, Order of Madam Justice S.M. Bensler dated Jun. 18, 2007.

Canadian Action No. 0601-08106, *Aram Systems Ltd.* v. *NovAtel Inc. and Patrick Fenton*, Expert Report of Dr. Pratap Misra, dated Jun. 15, 2007.

Canadian Action No. 0601-08106, *Aram Systems Ltd.* v. *NovAtel Inc. and Patrick Fenton*, Expert Report of David M. Quinlan, dated Jun. 15, 2007.

Canadian Action No. 0601-08106, *Aram Systems Ltd.* v. *NovAtel Inc. and Patrick Fenton*, Expert Report of Dr. Michel Fattouche dated Jun. 11, 2007.

Canadian Action No. 0601-08106, *Aram Systems Ltd.* v. *NovAtel Inc. and Patrick Fenton*, Expert Report of Thomas Schatzel, dated Jun. 20, 2007.

Canadian Action No. 0601-08106, *Aram Systems Ltd.* v. *NovAtel Inc. and Patrick Fenton*, Expert Report of Boris Kreye, dated Jun. 25, 2007.

Canadian Action No. 0601-08106, *Aram Systems Ltd.* v. *NovAtel Inc. and Patrick Fenton*, Supplemental Affidavit of Christopher Chamberlain sworn Jun. 26, 2007.

Canadian Action No. 0601-08106, *Aram Systems Ltd.* v. *NovAtel Inc. and Patrick Fenton*, Supplemental Revised Affidavit of Christopher Chamberlain sworn Jun. 27, 2007.

Canadian Action No. 0601-08106, *Aram Systems Ltd.* v. *NovAtel Inc. and Patrick Fenton*, Order of Associate Chief Justice N.C. Wittman dated Jun. 27, 2007, filed Jul. 5, 2007.

Canadian Action No. 0601-08106, *Aram Systems Ltd.* v. *NovAtel Inc. and Patrick Fenton*, Notice of Motion returnable Jul. 23, 2007 for an Order to strike portion of Expert Report of David Quinlan dated Jun. 15, 2007, filed Jul. 9, 2007.

Canadian Action No. 0601-08106, *Aram Systems Ltd.* v. *NovAtel Inc. and Patrick Fenton*, Written Brief of ARAM with respect to striking certain portions of the Expert Report of David Quinlan dated Jun. 15, 2007, dated Jul. 9, 2007.

Canadian Action No. 0601-08106, *Aram Systems Ltd.* v. *NovAtel Inc. and Patrick Fenton*, Reply Brief of NovAtel Inc. with respect to ARAM's application to strike portions of the Expert Report of David Quinlan returnable Jul. 23, 2007 before Justice Clark, dated Jul. 16, 2007.

Canadian Action No. 0601-08106, *Aram Systems Ltd.* v. *NovAtel Inc. and Patrick Fenton*, Third Supplemental Notice to Admit Facts, dated Jul. 18, 2007.

Canadian Action No. 0601-08106, *Aram Systems Ltd.* v. *NovAtel Inc. and Patrick Fenton*, Supplemental Written Brief of ARAM Systems with respect to the application to strike portions of the Expert Report of David Quinlan to be heard before Justice Clark on Jul. 23, 2007.

Canadian Action No. 0601-08106, *Aram Systems Ltd.* v. *NovAtel Inc. and Patrick Fenton*, Concurrent Offer of Judgment and Offer to Settle [Rules 169 and 170] of NovAtel, dated Aug. 14, 2007.

Canadian Action No. 0601-08106, *Aram Systems Ltd.* v. *NovAtel Inc. and Patrick Fenton*, Offer to Settle [Rule 170 and 174 (2) of the Alberta Rules of Court], dated Aug. 16, 2007.

Canadian Action No. 0601-08106, *Aram Systems Ltd.* v. *NovAtel Inc. and Patrick Fenton*, Reply to Notice to Admit Expert Opinion of Dr. Michel Fattouche dated Aug. 17, 2007.

Canadian Action No. 0601-08106, *Aram Systems Ltd.* v. *NovAtel Inc. and Patrick Fenton*, Revised Reply to Reply to Third Supplemental Notice to Admit Facts dated Aug. 20, 2007.

Canadian Action No. 0601-08106, *Aram Systems Ltd.* v. *NovAtel Inc. and Patrick Fenton*, Reply to Third Supplemental Notice to Admit Facts dated Aug. 17, 2007.

Canadian Action No. 0601-08106, *Aram Systems Ltd.* v. *NovAtel Inc. and Patrick Fenton*, Notice of Motion returnable to Aug. 31, 2007 for an Order striking certain portions of the Discovery Acceptance Form of Virgil G. Barfield dated Jul. 19, 2007, filed Aug. 24, 2007.

Canadian Action No. 0601-08106, *Aram Systems Ltd.* v. *NovAtel Inc. and Patrick Fenton*, Written Brief of NovAtel regarding an Order striking certain portions of the Discovery Acceptance Form of Virgil G. Barfield dated Jul. 19, 2007 , dated Aug. 24, 2007.

Canadian Action No. 0601-08106, *Aram Systems Ltd.* v. *NovAtel Inc. and Patrick Fenton*, Respondent's Brief of Argument with respect to Brief of NovAtel Inc. to be heard before the Presiding Justice in Special Chambers on Friday, Aug. 31, 2007, dated Aug. 29, 2007.

Canadian Action No. 0601-08106, *Aram Systems Ltd.* v. *NovAtel Inc. and Patrick Fenton*, Notice of Intention pursuant to Rule 296.1 not to call Debora Klause and Graham Purves at trial.

Canadian Action No. 0601-08106, *Aram Systems Ltd.* v. *NovAtel Inc. and Patrick Fenton*, Expert Statement pursuant to Rule 218.1 of the Alberta Rules of Court of Yasunori Ohtsuka.

Canadian Action No. 0601-08106, *Aram Systems Ltd.* v. *NovAtel Inc. and Patrick Fenton*, Expert Statement Pursuant to Rule 218.12 of the Alberta Rules of Court and Rebuttal Report of Partap Misra pursuant to Rule 218.1 re report of Michel Fattouche, dated Aug. 31, 2007.

Canadian Action No. 0601-08106, *Aram Systems Ltd.* v. *NovAtel Inc. and Patrick Fenton*, Expert Statement Pursuant to Rule 218.12 of the Alberta Rules of Court and Rebuttal Report of Korbinian Kopf pursuant to Rule 218.1 re report of Boris Kreye, dated Aug. 31, 2007.

Canadian Action No. 0601-08106, *Aram Systems Ltd.* v. *NovAtel Inc. and Patrick Fenton*, Expert Statement Pursuant to Rule 218.12 of the Alberta Rules of Court and Rebuttal Report of Bruce Stoner pursuant to Rule 218.1 re report of Thomas Schatze, dated Aug. 31, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re: report of Yascunori Ohtsuka dated Aug. 31, 2007, filed Sep. 4, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re: report of Korbinian Kopf dated Aug. 31, 2007, filed Sep. 4, 2007.

Canadian Action No. 0601-08106, *Aram Systems Ltd.* v. *NovAtel Inc. and Patrick Fenton*, Rule 218.12 Statement of Expert Rebuttal Opinion of Danny Huntington (re David Quinlan's report sworn Jun. 15, 2007), dated Sep. 4, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re Expert Report of Kazuhiko Yoshida dated Jun. 14, 2007, filed Sep. 6, 2007.

Canadian Action No. 0601-08106, *Aram Systems Ltd.* v. *NovAtel Inc. and Patrick Fenton*, Statement in Reply to Notice of Intention of Defendants to Enter as Evidence at Trial the Report of Yasunori Ohtsuka, dated Sep. 10, 2007.

Canadian Action No. 0601-08106, *Aram Systems Ltd.* v. *NovAtel Inc. and Patrick Fenton*, Statement in Reply to Notice of Intention of Defendants to Enter as Evidence at Trial the Report of Korbinian Kopf, dated Sep. 10, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re Expert Report of Boris Krey dated Jun. 25, 2007, filed Sep. 10, 2007.

Canadian Action No. 0601-08106, *Aram Systems Ltd.* v. *NovAtel Inc. and Patrick Fenton*, Amended Amended Amended Statement of Defence and Amended Amended Amended Counterclaim, dated Sep. 13, 2007.

Canadian Action No. 0601-08106, *Aram Systems Ltd.* v. *NovAtel Inc. and Patrick Fenton*, Further Amended Reply to Amended Amended Amended Statement of Defence and Amended Amended Amended Counterclaim, dated Sep. 17, 2007.

Canadian Action No. 0601-08106, *Aram Systems Ltd.* v. *NovAtel Inc. and Patrick Fenton*, Statement in Reply to Notice of Intention of the Plaintiff to Enter as Evidence at Trial the Report of Kazuhiko Yoshida, dated Sep. 18, 2007.

Canadian Action No. 0601-08106, *Aram Systems Ltd.* v. *NovAtel Inc. and Patrick Fenton*, Statement in Reply to Notice of Intention of the Plaintiff to Enter as Evidence at Trial the Report of Boris Kreye, dated Sep. 18, 2007.

Canadian Action No. 0601-08106, *Aram Systems Ltd.* v. *NovAtel Inc. and Patrick Fenton*, Pre-trial Brief of NovAtel for the trial to be heard before the Honourable Mr. Justice A.D. Macleod commencing Oct. 1, 2007 and Book of Authorities, dated Sep. 25, 2007.

Canadian Action No. 0601-08106, *Aram Systems Ltd.* v. *NovAtel Inc. and Patrick Fenton*, (a) Plaintiff's Brief of Relevant Issues and Applicable Law and authorities, (b) and (c) Trial Record (filed and unfiled) (d) and (e) 2 Vols. of Table of Authorities #1 - 37, dated Sep. 25, 2007.

Canadian Action No. 0601-08106, *Aram Systems Ltd.* v. *NovAtel Inc. and Patrick Fenton*, Continued Examination for Discovery of Jerald Harmon, dated Sep. 26, 2007.

Canadian Action No. 0601-08106, *Aram Systems Ltd.* v. *NovAtel Inc. and Patrick Fenton*, Notice of Withdrawal of Concurrent Offer of Judgment and Offer to Settle [Rule 170(5)], dated Sep. 28, 2007.

Canadian Action No. 0601-08106, *Aram Systems Ltd.* v. *NovAtel Inc. and Patrick Fenton*, Notice of Withdrawal of Offer, dated Oct. 1, 2007.

Canadian Action No. 0601-08106, *Aram Systems Ltd.* v. *NovAtel Inc. and Patrick Fenton*, Justice Clark's Order of Aug. 13, 2007.

Canadian Action No. 0601-08106, *Aram Systems Ltd.* v. *NovAtel Inc. and Patrick Fenton*, Justice Kent's Order of Aug. 31, 2007, dated Oct. 12, 2007.

Canadian Action No. 0601-08106, *Aram Systems Ltd.* v. *NovAtel Inc. and Patrick Fenton*, Pre-trial Brief of NovAtel for the trials to be heard before the Honourable Mr. Justic A.D. Macleod commencing Oct. 1, 2007, dated Sep. 25, 2007.

Canadian Action No. 0601-08106, *Aram Systems Ltd.* v. *NovAtel Inc. and Patrick Fenton*, Notice of Motion to be heard on Oct. 19, 2007 before Justice A.D. Macleod for an Order striking certain portions of the Expert Report of David Quinlan dated Jun. 15, 2007, filed Oct. 16, 2007.

Canadian Action No. 0601-08106, *Aram Systems Ltd.* v. *NovAtel Inc. and Patrick Fenton*, Written Brief of ARAM Systems Ltd. with respect to its motion seeking to strike certain portions of the Expert Report of David Quinlan dated Jun. 15, 2007, dated Oct. 15, 2007.

Canadian Action No. 0601-08106, *Aram Systems Ltd.* v. *NovAtel Inc. and Patrick Fenton*, Brief of NovAtel with respect to the Application of ARAM Systems Ltd. to strike portions of the Expert Opinion of David Quinlan to be heard before the Honourable Mr. Justice A.D. Macleod on Friday, Oct. 19, 2007, dated Oct. 16, 2007.

Canadian Action No. 0601-08106, *Aram Systems Ltd.* v. *NovAtel Inc. and Patrick Fenton*, Series of email messages (Exhibit P-48 of Dec. 18, 2006 Examination for Discovery of David Heidebrecht), various dates.

Canadian Action No. 0601-08106, *Aram Systems Ltd.* v. *NovAtel Inc. and Patrick Fenton*, ARIES RSR. (Exhibit P-59 of May 22, 2007 examination of Virgil Barfield).

Canadian Action No. 0601-08106, *Aram Systems Ltd.* v. *NovAtel Inc. and Patrick Fenton*, SEG 2001 ARAM Marketing Review "Structure for Growth" (Exhibit P-60 of May 22, 2007 Examination for Discovery of Virgil Barfield), dated Sep. 9, 2001.

Canadian Action No. 0601-08106, *Aram Systems Ltd.* v. *NovAtel Inc. and Patrick Fenton*, "Conquering Seismic Challenges" Exhibit P-41 of Nov. 21, 2006 Examination for Discovery of Virgil Barfield).

Canadian Action No. 0601-08106, *Aram Systems Ltd.* v. *NovAtel Inc. and Patrick Fenton*, Geo-X Systems travel and Entertainment Expenses (Exhibit P-49 of Dec. 18, 2006 Examination for Discovery of David Heidebrecht), dated Sep. 7, 2001.

Canadian Action No. 0601-08106, *Aram Systems Ltd.* v. *NovAtel Inc. and Patrick Fenton*, Email from David Heidebrecht to Terry Wood; and from Tim Jones to David Heidebrecht re: Trimble Information (Exhibit P-16 of Nov. 15, 2006 Examination for Discovery of Terry Wood), dated Sep. 24, 2001.

Canadian Action No. 0601-08106, *Aram Systems Ltd.* v. *NovAtel Inc. and Patrick Fenton*, E-mail from David Heidebrecht to Terry wood re: Trimble GPS products, dated Sep. 25, 2001.

Canadian Action No. 0601-08106, *Aram Systems Ltd.* v. *NovAtel Inc. and Patrick Fenton*, Email from Tim Jones to David Heidebrecht re: Embedded product offering (Exhibit P-5 of Nov. 15, 2006 Examination for Discovery of Zeljko Bacanek), dated Sep. 26, 2001.

Canadian Action No. 0601-08106, *Aram Systems Ltd.* v. *NovAtel Inc. and Patrick Fenton*, E-mail from David Heidebrecht to Terry wood re Tim Jones of Trimble, dated Sep. 26, 2007.

Canadian Action No. 0601-08106, *Aram Systems Ltd.* v. *NovAtel Inc. and Patrick Fenton*, E-mail from David Heidebrecht to Terry Wood re DCI Nextech, dated Sep. 26, 2007.

Canadian Action No. 0601-08106, *Aram Systems Ltd.* v. *NovAtel Inc. and Patrick Fenton*, E-mail from Eric de Kruyff of dci Nextech, dated Sep. 26, 2001.

Canadian Action No. 0601-08106, *Aram Systems Ltd.* v. *NovAtel Inc. and Patrick Fenton*, Email from Jerry Harmon to David Heidebrecht re: Impact of U.S. Appl. Nos. 6,078,283, 5,724,241 and 6,188,962 (Exhibit P-27 of Nov. 16, 2006 Examination for Discovery of Donald Chamberlain), dated Oct. 8, 2001.

Canadian Action No. 0601-08106, *Aram Systems Ltd.* v. *NovAtel Inc. and Patrick Fenton*, Email from Jerry Harmon to David Heidebrecht re: Two more U.S. Appl. Nos. 5,276,655 and 4,589,100 (Exhibit P-28 of Nov. 20, 2006 Examination for Discovery of Jerald Harmon), dated Oct. 9, 2001.

Canadian Action No. 0601-08106, *Aram Systems Ltd.* v. *NovAtel Inc. and Patrick Fenton*, Email from Mike April to Zeljko Bacanek re: Precise Freq. Reference (Exhibit P-6 from Nov. 15, 2006 Examination for Discovery of Zeljko Bacanek), dated Oct. 12, 2001.

Canadian Action No. 0601-08106, *Aram Systems Ltd.* v. *NovAtel Inc. and Patrick Fenton*, Geo-X Systems travel and Entertainment Expenses (Exhibit P-49 of Dec. 18, 2006 Examination for Discovery of David Heidebrecht), dated Oct. 22, 2001.

Canadian Action No. 0601-08106, *Aram Systems Ltd.* v. *NovAtel Inc. and Patrick Fenton*, Forwarded email to Jerry Harmon re: Patent search (Exhibit P-29 of Nov. 20, 2006 Examination for Discovery of Jerald Harmon), dated Nov. 1, 2001.

Canadian Action No. 0601-08106, *Aram Systems Ltd.* v. *NovAtel Inc. and Patrick Fenton*, Email from Roslyn Darroch to Terry Wood re: u-blox (Exhibit P-15 of Nov. 15, 2006 Examination for Discovery of Zeljko Bacanek), dated Nov. 9, 2001.

Canadian Action No. 0601-08106, *Aram Systems Ltd.* v. *NovAtel Inc. and Patrick Fenton*, Year 2001 Logbook (Exhibit P-42 to the Nov. 30, 2006 Examination of David Heidebrecht).

Canadian Action No. 0601-08106, *Aram Systems Ltd.* v. *NovAtel Inc. and Patrick Fenton*, Article from GPS World re: Assisted GPS (Exhibit P-7 from Nov. 15, 2006 Examination for Discovery of Zeljko Bacanek) dated Mar. 1, 2002.

Canadian Action No. 0601-08106, *Aram Systems Ltd.* v. *NovAtel Inc. and Patrick Fenton*, Email from Jerry Harmon to David Heidebrecht re: ARIES patent application (Exhibit P-30 of Nov. 20, 2006 Examination for Discovery of Jerald Harmon), dated Mar. 6, 2002.

Canadian Action No. 0601-08106, *Aram Systems Ltd.* v. *NovAtel Inc. and Patrick Fenton*, E-mail from Tim Jones to Terry Wood with attachments re Trimble GPS product, dated Apr. 1, 2002.

Canadian Action No. 0601-08106, *Aram Systems Ltd.* v. *NovAtel Inc. and Patrick Fenton*, E-mail from Terry Wood to Tim Jones re Lassen SQ unit, dated Apr. 2, 2002.

Canadian Action No. 0601-08106, *Aram Systems Ltd.* v. *NovAtel Inc. and Patrick Fenton*, E-mail from Jerry Harmon to David Heidebrecht, dated Apr. 10, 2002.

Canadian Action No. 0601-08106, *Aram Systems Ltd.* v. *NovAtel Inc. and Patrick Fenton*, E-mail from Tim Jones to Terry Wood, dated Apr. 15, 2002.

Canadian Action No. 0601-08106, *Aram Systems Ltd.* v. *NovAtel Inc. and Patrick Fenton*, Building schematics/Diagram (Exhibit P-46 of Dec. 18, 2006 Examination for Discovery of David Heidebrecht), dated Jun. 6, 2002.

Canadian Action No. 0601-08106, *Aram Systems Ltd.* v. *NovAtel Inc. and Patrick Fenton*, E-mail from Tim Jones to David Heidebrecht regarding Trimble GPS product, dated Aug. 2, 2001.

Canadian Action No. 0601-08106, *Aram Systems Ltd.* v. *NovAtel Inc. and Patrick Fenton*, Email from David Heidebrecht to Jerry Harmon re: RF Sychronization patent (Exhibit P-31 of Nov. 20, 2006 Examination for Discovery of Jerald Harmon), dated Aug. 23, 2002.

Canadian Action No. 0601-08106, *Aram Systems Ltd.* v. *NovAtel Inc. and Patrick Fenton*, From Trimble Website, Why a GPS Receiver Must Determine its Correct Geographic Position before it Calculates Correct GPS time, dated Aug. 2002.

Canadian Action No. 0601-08106, *Aram Systems Ltd.* v. *NovAtel Inc. and Patrick Fenton*, Fax to Jerry Harmon from David Heidebrecht re RF Patent, dated Sep. 4, 2002.

Canadian Action No. 0601-08106, *Aram Systems Ltd.* v. *NovAtel Inc. and Patrick Fenton*, Email from David Heidebrecht to Allen Marcontell and Jerry Harmon and attachment (Exhibit P-32 to Nov. 20, 2006 Examination for Discovery of Jerald Harmon), dated Sep. 6, 2002.

Canadian Action No. 0601-08106, *Aram Systems Ltd.* v. *NovAtel Inc. and Patrick Fenton*, Email from Nerac to David Heidebrecht enclosing patent searches, dated Sep. 6, 2002.

Canadian Action No. 0601-08106, *Aram Systems Ltd.* v. *NovAtel Inc. and Patrick Fenton*, Fax from David Heidebrecht to Jerry Harmon re: Wireless Ram; and Clock Module Mobile (Exhibit P-8 from Nov. 15, 2006 Examination for Discovery of Zeljko Bacanek), dated Sep. 10, 2002.

Canadian Action No. 0601-08106, *Aram Systems Ltd.* v. *NovAtel Inc. and Patrick Fenton*, E-mail from Mike Crowe of Microwe Electronics Corp. to Zeljko Bacanek, dated Sep. 12, 2002.

Canadian Action No. 0601-08106, *Aram Systems Ltd.* v. *NovAtel Inc. and Patrick Fenton*, E-mail from Mike Crowe to Zielko Bacanek re Leadtek GPS units, dated Sep. 22, 2002.

Canadian Action No. 0601-08106, *Aram Systems Ltd.* v. *NovAtel Inc. and Patrick Fenton*, ARAM U.S. Appl. No. 60/416070 (Exhibit P-17 of Nov. 16, 2006 Examination for Discovery of Donald Chamberlain), dated Oct. 4, 2002.

Canadian Action No. 0601-08106, *Aram Systems Ltd.* v. *NovAtel Inc. and Patrick Fenton*, Email from David Heidebrecht to Terry Wood re E-mail from Mike Crowe of Microwe Electronics to David Heidebrecht, dated Oct. 23, 2002.

Canadian Action No. 0601-08106, *Aram Systems Ltd.* v. *NovAtel Inc. and Patrick Fenton*, Year 2002 Logbook (Exhibit P-43 to the Nov. 30, 2006 Examination of David Heidebrecht).

Canadian Action No. 0601-08106, *Aram Systems Ltd.* v. *NovAtel Inc. and Patrick Fenton*, Email from David Heidebrecht to Glenn Skelton, Zeljko Bacanek and Terry Wood re: Summary of projects (Exhibit P-9 of Nov. 15, 2006 Examination for Discovery of Zeljko Bacanek), dated Jan. 31, 2003.

Canadian Action No. 0601-08106, *Aram Systems Ltd.* v. *NovAtel Inc. and Patrick Fenton*, Current Project Report revised by Terry Wood (Exhibit P-10 of Nov. 15, 2006 Examination for Discovery of Zeljko Bacanek), dated Feb. 3, 2003.

Canadian Action No. 0601-08106, *Aram Systems Ltd.* v. *NovAtel Inc. and Patrick Fenton*, E-mail from Heidebrecht to Wood re Adcon Telemetry, dated May 4, 2003.

Canadian Action No. 0601-08106, *Aram Systems Ltd.* v. *NovAtel Inc. and Patrick Fenton*, Email from Jerry Harmon to David Heidebrecht re: Nerac conference call (Exhibit P-33 of Nov. 20, 2006 Examination for Discovery of Jerald Harmon), dated May 2, 2003.

Canadian Action No. 0601-08106, *Aram Systems Ltd.* v. *NovAtel Inc. and Patrick Fenton*, E-mail from NERAC to David Heidebrecht, dated May 5, 2003.

Canadian Action No. 0601-08106, *Aram Systems Ltd.* v. *NovAtel Inc. and Patrick Fenton*, Calendar with Attached Calendars (Exhibit D-10 from Nov. 14, 2006 Examination for Discovery of Fenton, dated Jun. 2003.

Canadian Action No. 0601-08106, *Aram Systems Ltd.* v. *NovAtel Inc. and Patrick Fenton*, E-Mail from Nicholas Schubert re meeting with Geo-X (Exhibit D-5 from Nov. 14, 2006 Examination for Discovery of Fenton, also marked as Exhibit D-55 from Ladd discovery), dated Jun. 11, 2003.

Canadian Action No. 0601-08106, *Aram Systems Ltd.* v. *NovAtel Inc. and Patrick Fenton*, Notes of Schubert (Exhibit D-6 from Nov. 14, 2006 Examination for Discovery of Fenton), dated Jun. 11, 2003.

Canadian Action No. 0601-08106, *Aram Systems Ltd.* v. *NovAtel Inc. and Patrick Fenton*, E-mail from Nicholas Schubert to Dave Heidebrecht re Meeting follow-up (Exhibit D-7 from Nov. 14, 2006 Examination for Discovery of Fenton), dated Jun. 12, 2003.

Canadian Action No. 0601-08106, *Aram Systems Ltd.* v. *NovAtel Inc. and Patrick Fenton*, Email from Nicholas Schubert to David Heidebrecht re: potential meeting (Exhibit D-61 from Nov. 22, 2006 Examination for discovery of G. Purves), dated Jun. 13, 2003.

Canadian Action No. 0601-08106, *Aram Systems Ltd.* v. *NovAtel Inc. and Patrick Fenton*, Email from Nicholas Schubert to David Heidebrecht re: potential meeting (Exhibit D-67 from Nov. 24, 2006 Examination for Discovery of F. Halsey), dated Jun. 13, 2003.

Canadian Action No. 0601-08106, *Aram Systems Ltd.* v. *NovAtel Inc. and Patrick Fenton*, E-mail from Nicholas Schubert to David Heidebrecht - Re: Potential Wednesday meeting, dated Jun. 13, 2003.

Canadian Action No. 0601-08106, *Aram Systems Ltd.* v. *NovAtel Inc. and Patrick Fenton*, E-mail from David Heidebrecht to Nicholas Schubert - Re: Potential Wednesday meeting, dated Jun. 16, 2003.

Canadian Action No. 0601-08106, *Aram Systems Ltd.* v. *NovAtel Inc. and Patrick Fenton*, Meeting request from Nicholas Schubert to discuss L1 products (Exhibit D-8 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Meeting acceptance from Patrick Fenton (Exhibit D-9 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Handwritten notes re: Aram (Exhibit D-11 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Email from Pat Fenton to Debora Klaus re: Need NDA (Exhibit D-69 from Nov. 27, 2006 Examination for Discovery of D. Klaus), dated Jun. 18, 2003.

Canadian Action No. 0601-08106, *Aram Systems Ltd.* v. *NovAtel Inc. and Patrick Fenton*, Non-Disclosure Agreement (Exhibit D-2 from Nov. 14, 2006 Examination for Discovery of Fenton), dated Jun. 18, 2003.

Canadian Action No. 0601-08108, *Aram Systems Ltd.* v. *NovAtel Inc. and Patrick Fenton*, Aram Geo-X Seismic L1 Opportunity (Exhibit D-14 from Nov. 14, 2006 Examination for Discovery of Fenton).

Canadian Action No. 0601-08108, *Aram Systems Ltd.* v. *NovAtel Inc. and Patrick Fenton*, L1 Land Seismic (Exhibit D-15 from Nov. 14, 2006 Examination for Discovery of Fenton).

Canadian Action No. 0601-08108, *Aram Systems Ltd.* v. *NovAtel Inc. and Patrick Fenton*, E-Mail from Patrick Fenton to Steve Duncombe and Nicholas Schubert re: L1 Seismic Opportunity (Exhibit D-18 from Nov. 14,, 2006 Examination for Discovery of Fenton), dated Jul. 11, 2003.

Canadian Action No. 0601-08108, *Aram Systems Ltd.* v. *NovAtel Inc. and Patrick Fenton*, E-mail from Patrick Fenton to Nicholas Schubert/Steve Duncombe re: L1 Seismic Opportunity (Exhibit D-56 from Nov. 17, 2006 Examination for Discovery of Jon Ladd), dated Jul. 11, 2003.

Canadian Action No. 0601-08108, *Aram Systems Ltd.* v. *NovAtel Inc. and Patrick Fenton*, Picture 0103 of NovAtel Production.

Canadian Action No. 0601-08108, *Aram Systems Ltd.* v. *NovAtel Inc. and Patrick Fenton*, Picture (Exhibit D-13 from Nov. 14, 2006 Examination for Discovery of Fenton).

Canadian Action No. 0601-08108, *Aram Systems Ltd.* v. *NovAtel Inc. and Patrick Fenton*, E-mail from Jerry Harmon to David Heidebrecht, dated Jul. 14, 2003.

Canadian Action No. 0601-08108, *Aram Systems Ltd.* v. *NovAtel Inc. and Patrick Fenton*, E-mail from Patrick Fenton to Dave Heidebrecht re: GPS Proposal for Seismic (Exhibit D-19 from Nov. 14, 2006 Examination for Discovery of Fenton), dated Jul. 16, 2003.

Canadian Action No. 0601-08108, *Aram Systems Ltd.* v. *NovAtel Inc. and Patrick Fenton*, Provisional Patent Application, Exhibit D-20 from Nov. 14, 2006 Examination for Discovery of Fenton), dated Jul. 17, 2003.

Canadian Action No. 0601-08108, *Aram Systems Ltd.* v. *NovAtel Inc. and Patrick Fenton*, Land Seismic L1 Opportunity, D04526 [Rev: 0B] - blacklined, dated Jul. 17, 2007.

Canadian Action No. 0601-08108, *Aram Systems Ltd.* v. *NovAtel Inc. and Patrick Fenton*, Land Seismic L1 Opportunity, dated Jul. 17, 2003.

Canadian Action No. 0601-08106, *Aram Systems Ltd.* v. *NovAtel Inc. and Patrick Fenton*, Notes on David Heidebrecht GPS patent (Exhibit P-20 of Nov. 16, 2006 Examination for Discovery of Donald Chamberlain), dated Jul. 18, 2003.

Canadian Action No. 0601-08106, *Aram Systems Ltd.* v. *NovAtel Inc. and Patrick Fenton*, Calendar (Exhibit D-27 from Nov. 14, 2006 Examination for Discovery of Fenton), dated Aug. 2003.

Canadian Action No. 0601-08106, *Aram Systems Ltd.* v. *NovAtel Inc. and Patrick Fenton*, E-Mail from Patrick Fenton to Dave Heidebrecht re: NovAtel Proposal (Exhibit D-24 from Nov. 14, 2006 Examination for Discovery of Fenton), dated Aug. 6, 2003.

Canadian Action No. 0601-08106, *Aram Systems Ltd.* v. *NovAtel Inc. and Patrick Fenton*, E-Mail from David Heidebrecht to Patrick Fenton Re: NovAtel Proposal (Exhibit P-12 from Nov. 15, 2006 Examination for Discovery of Zeljko, dated Aug. 6, 2003.

Canadian Action No. 0601-08106, *Aram Systems Ltd.* v. *NovAtel Inc. and Patrick Fenton*, E-Mail from Patrick Fenton to Dave Heidebrecht re: NovAtel Proposal (Exhibit D-26 from Nov. 14, 2006 Examination for Discovery of Fenton), dated Aug. 6, 2003.

Canadian Action No. 0601-08106, *Aram Systems Ltd.* v. *NovAtel Inc. and Patrick Fenton*, E-mail from David Heidebrecht to Patrick Fenton, with attachments, dated Aug. 6, 2003.

Canadian Action No. 0601-08106, *Aram Systems Ltd.* v. *NovAtel Inc. and Patrick Fenton*, Email from Pat Fenton to David Heidebrecht re: NovAtel Proposal (Exhibit D-62 from Nov. 22, 2006 Examination for Discovery of G. Purves), dated Aug. 7, 2003.

Canadian Action No. 0601-08106, *Aram Systems Ltd.* v. *NovAtel Inc. and Patrick Fenton*, Email exchange between Pat Fenton and David Heidebrecht re: GPS 101 (Exhibit P-52 from Dec. 18, 2006 Examination for Discovery of David Heidebrecht), dated Aug. 7 and 8, 2003.

Canadian Action No. 0601-08106, *Aram Systems Ltd.* v. *NovAtel Inc. and Patrick Fenton*, Notes (Exhibit D-28 to Nov. 14, 2006 Examination for Discovery of David Heidebrecht), dated Aug. 7 and 8, 2003.

Canadian Action No. 0601-08106, *Aram Systems Ltd.* v. *NovAtel Inc. and Patrick Fenton*, Notes titled "Telecon - David H." (Exhibit P-34 to Nov. 20, 2006 Examination for discovery of Jerald Harmon), dated Aug. 20, 2003.

Canadian Action No. 0601-08106, *Aram Systems Ltd.* v. *NovAtel Inc. and Patrick Fenton*, Document entitled "Aram Direction" (Exhibit P-1 of Nov. 15, 2006 Examination for Discovery of Zeljko Bacanek).

Canadian Action No. 0601-08106, *Aram Systems Ltd.* v. *NovAtel Inc. and Patrick Fenton*, Document entitled "Aram Direction" with handwritten notes (Exhibit P-2 of Nov. 15, 2006 Examination for Discovery of Zeljko Bacanek).

Canadian Action No. 0601-08106, *Aram Systems Ltd.* v. *NovAtel Inc. and Patrick Fenton*, Document entitled "Aram Direction" with handwritten notes (Exhibit P-3 of Nov. 15, 2006 Examination for Discovery of Zeljko Bacanek), dated Aug. 20, 2003.

Canadian Action No. 0601-08106, *Aram Systems Ltd.* v. *NovAtel Inc. and Patrick Fenton*, Declaration and Power of Attorney of Donald Chamberlain (Exhibit P-19 of Nov. 16, 2006 Examination for Discovery of Donald Chamberlain), dated Sep. 25, 2003.

Canadian Action No. 0601-08106, *Aram Systems Ltd.* v. *NovAtel Inc. and Patrick Fenton*, Handwritten Notes (Exhibit P-65 of Sep. 26, 2007 Examination for Discovery of J. Harmon), dated Oct. 6, 2003.

Canadian Action No. 0601-08106, *Aram Systems Ltd.* v. *NovAtel Inc. and Patrick Fenton*, Handwritten Notes (Exhibit P-66 of Sep. 26, 2007 Examination for Discovery of J. Harmon), dated Oct. 6, 2003.

Canadian Action No. 0601-08106, *Aram Systems Ltd.* v. *NovAtel Inc. and Patrick Fenton*, Handwritten Notes(Exhibit P-67 of Sep. 26, 2007 Examination for Discovery of J. Harmon, dated Oct. 6, 2003.

Canadian Action No. 0601-08106, *Aram Systems Ltd.* v. *NovAtel Inc. and Patrick Fenton*, Seismic_proposal3 .jpg (Exhibit D-12 from Nov. 14, 2006 Examination for Discovery of Fenton), dated Oct. 15, 2003.

Canadian Action No. 0601-08106, *Aram Systems Ltd.* v. *NovAtel Inc. and Patrick Fenton*, Utility Patent Application Transmittal (Exhibit P-54 of Dec. 18, 2006 Examination for Discovery of David Heidebrecht), dated Oct. 25, 2003.

Canadian Action No. 0601-08106, *Aram Systems Ltd.* v. *NovAtel Inc. and Patrick Fenton*, Calendar (Exhibit D-35 from Nov. 14, 2006 Examination for Discovery of Fenton), dated Nov. 2003.

Canadian Action No. 0601-08106, *Aram Systems Ltd.* v. *NovAtel Inc. and Patrick Fenton*, Land Seismic L1 Opportunity, D04526 [Rev: 0C] - blacklined, dated Nov. 2003.

Canadian Action No. 0601-08106, *Aram Systems Ltd.* v. *NovAtel Inc. and Patrick Fenton*, Land Seismic L1 Opportunity, D04526 [Rev: 0C], dated Nov. 2003.

Canadian Action No. 0601-08106, *Aram Systems Ltd.* v. *NovAtel Inc. and Patrick Fenton*, E-Mail from Steve Duncombe to Graham Purves re: Seismic Report (Exhibit D-34 from Nov. 14, 2006 Examination for Discovery of Fenton), dated Nov. 3, 2003.

Canadian Action No. 0601-08106, *Aram Systems Ltd.* v. *NovAtel Inc. and Patrick Fenton*, Email from Steve Duncombe to Graham Purves re: Seismic Report (Exhibit D-75 from Dec. 12, 2006 Examination for Discovery of S. Duncombe), dated Nov. 3, 2003.

Canadian Action No. 0601-08106, *Aram Systems Ltd.* v. *NovAtel Inc. and Patrick Fenton*, Email from Pat Fenton to Recipient ("Jim") re: benefit of integration of GPS into seismic cables (Exhibit D-77 from Dec. 12, 2006 Examination for Discovery of S. Duncombe), dated Nov. 14, 2003.

Canadian Action No. 0601-08106, *Aram Systems Ltd.* v. *NovAtel Inc. and Patrick Fenton*, Email from Pat Fenton to Recipient ("Jim") re: NovAtel Proposal (Exhibit D-93 from Dec. 19, 2006 Examination for Discovery of P.C. Fenton), dated Nov. 14, 2003.

Canadian Action No. 0601-08106, *Aram Systems Ltd.* v. *NovAtel Inc. and Patrick Fenton*, Year 2003 Logbook.

Canadian Action No. 0601-08106, *Aram Systems Ltd.* v. *NovAtel Inc. and Patrick Fenton*, Patent Activity Summary (P-61 from Examination for Discovery of Virgil Barfield), dated Jan. 6, 2004.

Canadian Action No. 0601-08106, *Aram Systems Ltd.* v. *NovAtel Inc. and Patrick Fenton*, Calendar (Exhibit D-36 from Nov. 14, 2006 Examination for Discovery of Fenton), dated Feb. 2004.

Canadian Action No. 0601-08106, *Aram Systems Ltd.* v. *NovAtel Inc. and Patrick Fenton*, Declaration and Power of Attorney - Donald Chamberlain and David Heidebrecht (Exhibit P-53 of Dec. 18, 2006 Examination for Discovery of David Heidebrecht), Dated Apr. 6, 2004.

Canadian Action No. 0601-08106, *Aram Systems Ltd.* v. *NovAtel Inc. and Patrick Fenton*, SEC filing including Patrick Fenton employment contract (Exhibit D-112 from Jun. 26, 2007 Examination for Discovery of Patrick Fenton), dated May 26, 2004.

Canadian Action No. 0601-08106, *Aram Systems Ltd.* v. *NovAtel Inc. and Patrick Fenton*, Calendar (Exhibit D-37 from Nov. 14, 2006 Examination for Discovery of Fenton), dated Jun. 2004.

Canadian Action No. 0601-08106, *Aram Systems Ltd.* v. *NovAtel Inc. and Patrick Fenton*, U.S. Appl. No. 2004/0105341 (Exhibit D-87 from Dec. 19, 2006 Examination for Discovery of P.C. Fenton and Exhibit P-18 of Nov. 15, 2006 Examination for Discovery of David Chamberlain, dated Jun. 3, 2004.

Canadian Action No. 0601-08106, *Aram Systems Ltd.* v. *NovAtel Inc. and Patrick Fenton*, Geo-X Meeting (Exhibit D-38 from Nov. 14, 2006 Examination for Discovery of Fenton), dated Jun. 21, 2004.

Canadian Action No. 0601-08106, *Aram Systems Ltd.* v. *NovAtel Inc. and Patrick Fenton*, Geo-X Synchronization and GPS patents applications - Status (Exhibit P-35 of Nov. 20, 2006 Examination for Discovery of Jerald Harmon), dated Jul. 7, 2004.

Canadian Action No. 0601-08106, *Aram Systems Ltd.* v. *NovAtel Inc. and Patrick Fenton*, Email from Jerry Harmon to David Heidebrecht re: NovAtel patent applications (Exhibit P-36 of Nov. 20, 2006 Examination for Discovery of Jerald Harmon), dated Jul. 8, 2004.

Canadian Action No. 0601-08106, *Aram Systems Ltd.* v. *NovAtel Inc. and Patrick Fenton*, Email from Jerry Harmon to David Heidebrecht re: NovAtel patent applications (Exhibit P-14 of Nov. 15, 2006 Examination for Discovery of Zeljko Bacanek) . Dated Jul. 12, 2004.

Canadian Action No. 0601-08106, *Aram Systems Ltd.* v. *NovAtel Inc. and Patrick Fenton*, Undertakings of Patrick C. Fenton re: Application of P. Fenton for "A Seismic Measuring System Including GPS receivers" (Exhibit D-91 from Dec. 19, 2006 Examination for Discovery of P.C. Fenton), dated Jul. 16, 2004.

Canadian Action No. 0601-08106, *Aram Systems Ltd.* v. *NovAtel Inc. and Patrick Fenton*, PCT Patent Application (Exhibit D-40 from Nov. 14, 2006 Examination for Discovery of P.C. Fenton), dated Jul. 16, 2004.

Canadian Action No. 0601-08106, *Aram Systems Ltd.* v. *NovAtel Inc. and Patrick Fenton*, Undertakings of Patrick C. Fenton re: Assignment of Patent (Exhibit D-88 from Dec. 19, 2006 Examination for Discovery of P.C. Fenton), dated Oct. 26, 2004.

Canadian Action No. 0601-08106, *Aram Systems Ltd.* v. *NovAtel Inc. and Patrick Fenton*, U.S. Appl. No. 10/891,800 - date Jul. 15, 2004 (Exhibit D-39 from Nov. 14, 2006 Examination for Discovery of Fenton). Previously marked as Exhibit PS-3 at Sep. 15, 2006 cross-examination on affidavit of Fenton., dated Feb. 10. 2005.

Canadian Action No. 0601-08106, *Aram Systems Ltd.* v. *NovAtel Inc. and Patrick Fenton*, Aram Aries Specifications (Exhibit P-40 of Nov. 21, 2006 Examination for Discovery of Virgil Barfield), dated Mar. 2005.

Canadian Action No. 0601-08106, *Aram Systems Ltd.* v. *NovAtel Inc. and Patrick Fenton*, U.S. Appl. No. 2005/0047575 (Exhibit P-22 of Nov. 16, 2006 Examination for Discovery of Donald Chamberlain), dated Mar. 3, 2005.

Canadian Action No. 0601-08106, *Aram Systems Ltd.* v. *NovAtel Inc. and Patrick Fenton*, USPTO Office Action Summary re U.S. Appl. No. 10/693,298, dated Mar. 16, 2005.

Canadian Action No. 0601-08106, *Aram Systems Ltd.* v. *NovAtel Inc. and Patrick Fenton*, Letter from Patricia Sheehan to Chris Chamberlain re: Demand to abandon CIP (Exhibit P-24 of Nov. 15, 2006 Examination for Discovery of Donald Chamberlain) dated Jul. 22, 2005.

Canadian Action No. 0601-08106, *Aram Systems Ltd.* v. *NovAtel Inc. and Patrick Fenton*, Fax to Jerry Harmon from Oliver Kuhn, dated Jul. 28, 2005.

Canadian Action No. 0601-08106, *Aram Systems Ltd.* v. *NovAtel Inc. and Patrick Fenton*, Letter from Patricia Sheehan to Chris Chamberlain re: Follow up on Jul. 22, 2005 letter (Exhibit P-25 of Nov. 16, 2006 Examination for Discovery of Donald Chamberlain), dated Aug. 10, 2005.

Canadian Action No. 0601-08106, *Aram Systems Ltd.* v. *NovAtel Inc. and Patrick Fenton*, Letter from D. Brit Nelson to Patricia Sheehan, dated Aug. 26, 2005.

Canadian Action No. 0601-08106, *Aram Systems Ltd.* v. *NovAtel Inc. and Patrick Fenton*, Letter from D. Brit Nelson to Patricia Sheehan re: Response to Patricia Sheehan's letters of Jul. 22, and Aug. 10, 2005 (Exhibit P-26 of Nov. 16, 2006 Examination for Discovery of Donald Chamberlain), dated Sep. 30, 3005.

Canadian Action No. 0601-08106, *Aram Systems Ltd.* v. *NovAtel Inc. and Patrick Fenton*, Letter from P.A. Sheehan to D.B. Nelson, dated Oct. 12, 2005.

Canadian Action No. 0601-08106, *Aram Systems Ltd.* v. *NovAtel Inc. and Patrick Fenton*, Letter from D.B. Nelson to P.A. Sheehan, dated Oct. 18, 2005.

Canadian Action No. 0601-08106, *Aram Systems Ltd.* v. *NovAtel Inc. and Patrick Fenton*, Information Disclosure statement re Fenton US Patent Application, Dated Oct. 21, 2005.

Canadian Action No. 0601-08106, *Aram Systems Ltd.* v. *NovAtel Inc. and Patrick Fenton*, Letter from P.A. Sheehan to D.B. Nelson, dated Oct. 25, 2005.

Canadian Action No. 0601-08106, *Aram Systems Ltd.* v. *NovAtel Inc. and Patrick Fenton*, D.B. Nelson to P.A. Sheehan, dated Dec. 9, 2005.

Canadian Action No. 0601-08106, *Aram Systems Ltd.* v. *NovAtel Inc. and Patrick Fenton*, Canadian Patent Application (Exhibit D-41 from Nov. 14, 2006 Examination for Discovery of Fenton), dated Jan. 16, 2006.

Canadian Action No. 0601-08106, *Aram Systems Ltd.* v. *NovAtel Inc. and Patrick Fenton*, EPO Patent Application (Exhibit D-43 from Nov. 14, 2006 Examination for Discovery of Fenton), dated Mar. 8, 2006.

Canadian Action No. 0601-08106, *Aram Systems Ltd.* v. *NovAtel Inc. and Patrick Fenton*, Letter from Jon Ladd (NovAtel Inc.) to Chris Chamberlain (Aram Systems) re: U.S. Appl. No. 2005/0033519 and U.S. Appl. No. 2005/0047275 (Exhibit D-59 from Nov. 17, 2006 Examination for Discovery of Jon Ladd), dated Apr. 3, 2006.

Canadian Action No. 0601-08106, *Aram Systems Ltd.* v. *NovAtel Inc. and Patrick Fenton*, Information disclosure statement by Applicant re Fenton U.S. Patent Application, dated May 23, 2006.

Canadian Action No. 0601-08106, *Aram Systems Ltd.* v. *NovAtel Inc. and Patrick Fenton*, Undertakings of Patrick C. Fenton re: Application by P. Fenton for Notice of Allowability (Exhibit D-89 from Dec. 19, 2006 Examination for Discovery of P.C. Fenton), dated May 23, 2006.

Canadian Action No. 0601-08106, *Aram Systems Ltd.* v. *NovAtel Inc. and Patrick Fenton*, E-mail from Nicholas Schubert to David Heidebrecht, dated Jun. 12, 2003.

Canadian Action No. 0601-08106, *Aram Systems Ltd.* v. *NovAtel Inc. and Patrick Fenton*, Interview Summary re Jul. 27, 2006 conference call, dated Jul. 20, 2006.

Canadian Action No. 0601-08106, *Aram Systems Ltd.* v. *NovAtel Inc. and Patrick Fenton*, Interview Summary re Teleconference between Patricia Sheehan and USPTO, dated Jul. 27, 2006.

Canadian Action No. 0601-08106, *Aram Systems Ltd.* v. *NovAtel Inc. and Patrick Fenton*, Amended Claims of Fenton US Patent Application (Exhibit D-44 from Nov. 14, 2006 Examination for Discovery of Fenton), also previously marked as Exhibit DS-6 of Fenton Sep. 15, 2006 cross-exam), dated Jul. 28, 2006.

Canadian Action No. 0601-08106, *Aram Systems Ltd.* v. *NovAtel Inc. and Patrick Fenton*, Notice of Allowability regarding Fenton US Patent, dated Aug. 2, 2006.

Canadian Action No. 0601-08106, *Aram Systems Ltd.* v. *NovAtel Inc. and Patrick Fenton*, Undertakings of Patrick C. Fenton re: Notice of Allowance and Fees Due (Exhibit D-90 from Dec. 19, 2006 Examination for Discovery of P.C. Fenton), dated Aug. 7, 2006.

Canadian Action No. 0601-08106, *Aram Systems Ltd.* v. *NovAtel Inc. and Patrick Fenton*, US Deformation Monitoring U.S. Appl. No. 11/502,086, dated Aug. 10, 2006.

Canadian Action No. 0601-08106, *Aram Systems Ltd.* v. *NovAtel Inc. and Patrick Fenton*, Affidavit of David Heidebrecht sworn Aug. 11, 2006.

Canadian Action No. 0601-08106, *Aram Systems Ltd.* v. *NovAtel Inc. and Patrick Fenton*, NDA created Jun. 18, 2003 Geo-X Properties (Exhibit D-3 from Nov. 14, 2006 Examination for Discovery of Fenton), dated Aug. 21, 2003.

Canadian Action No. 0601-08106, *Aram Systems Ltd.* v. *NovAtel Inc. and Patrick Fenton*, L1 land Seismic Opportunity (Exhibit P-51 of Dec. 18, 2006 Examination for Discovery of David Heidebrecht), dated Aug. 25, 2006.

Canadian Action No. 0601-08106, *Aram Systems Ltd.* v. *NovAtel Inc. and Patrick Fenton*, Transmittal Letter of Explanation for Divisional Application (Exhibit P-39 from Nov. 20, 2006 Examination for Discovery of Jerald Harmon), dated Oct. 2, 2006.

Canadian Action No. 0601-08106, *Aram Systems Ltd.* v. *NovAtel Inc. and Patrick Fenton*, Continuation Application (Exhibit P-38 to Nov. 20, 2006 Examination for Discovery of Jerald Harmon), dated Oct. 2, 2006.

Canadian Action No. 0601-08106, *Aram Systems Ltd.* v. *NovAtel Inc. and Patrick Fenton*, U.S. Appl. No. 7,117,094 - Issued Oct. 3, 2006.

Canadian Action No. 0601-08106, *Aram Systems Ltd.* v. *NovAtel Inc. and Patrick Fenton*, File Wrap history of Fenton US patent application, dated Oct. 4, 2006.

Canadian Action No. 0601-08106, *Aram Systems Ltd.* v. *NovAtel Inc. and Patrick Fenton*, Canadian Patent Abstract (Exhibit D-42 from Nov. 14, 2006 Examination for Discovery of Fenton), dated Oct. 6, 2006.

Canadian Action No. 0601-08106, *Aram Systems Ltd.* v. *NovAtel Inc. and Patrick Fenton*, Email from Jerry Harmon to Virgil Barfield et. al re: Follow up information from Apr. 3, 2006 meeting (Exhibit P-37 of Nov. 20, 2006 Examination for Discovery of Jerald Harmon), dated Apr. 3, 2006.

Canadian Action No. 0601-08106, *Aram Systems Ltd.* v. *NovAtel Inc. and Patrick Fenton*, Responses to Undertakings of Patrick Charles Fenton (Exhibit D-78 from Dec. 12, 2006 Examination for Discovery of S. Duncombe), dated Nov. 14, 2006.

Canadian Action No. 0601-08106, *Aram Systems Ltd.* v. *NovAtel Inc. and Patrick Fenton*, Amended Responses to Undertakings of Patrick C. Fenton (Exhibit D-92 from Dec. 19, 2006 Examination for Discovery of P.C. Fenton), dated No. 14, 2006.

Canadian Action No. 0601-08106, *Aram Systems Ltd.* v. *NovAtel Inc. and Patrick Fenton*, Cell phone usage of David Heidebrecht (Exhibit P-50 of Dec. 18, 2006 Examination for Discovery of David Heidebrecht), dated Nov. 14, 2006.

Canadian Action No. 0601-08106, *Aram Systems Ltd.* v. *NovAtel Inc. and Patrick Fenton*, Radio Report and Status (Exhibit P-4 from Nov. 15, 2006 Examination for Discovery of Zeljko Bacanek), dated 2003.

Canadian Action No. 0601-08106, *Aram Systems Ltd.* v. *NovAtel Inc. and Patrick Fenton*, Responses to Undertakings of Jonathan W. Ladd (Exhibit D-86 from Dec. 12, 2006 Examination for Discovery of S. Duncombe), dated Nov. 17, 2006.

Canadian Action No. 0601-08106, *Aram Systems Ltd.* v. *NovAtel Inc. and Patrick Fenton*, Responses to Undertakings of Jonathan W. Ladd (Exhibit D-99 from Dec. 19, 2006 Examination for Discovery of P.C. Fenton), dated Nov. 17, 2006.

Canadian Action No. 0601-08106, *Aram Systems Ltd.* v. *NovAtel Inc. and Patrick Fenton*, Record of entry/exit into facility (Exhibit P-47 of Dec. 18, 2006 Examination for Discovery of David Heidebrecht), dated Jun. 19, 2003.

Canadian Action No. 0601-08106, *Aram Systems Ltd.* v. *NovAtel Inc. and Patrick Fenton*, Responses to Undertakings of Graham Purves (Exhibit D-97 from Dec. 19, 2006 Examination for Discovery of P.C. Fenton), dated Nov. 22, 2006.

Canadian Action No. 0601-08106, *Aram Systems Ltd.* v. *NovAtel Inc. and Patrick Fenton*, Responses to Undertakings of Farlin Halsey (Exhibit D-95 from Dec. 19, 2006 Examination for Discovery of P.C. Fenton), dated Nov. 24, 2006.

Canadian Action No. 0601-08106, *Aram Systems Ltd.* v. *NovAtel Inc. and Patrick Fenton*, Interview Summary (Exhibit P-55 from Dec. 18, 2006 Examination for Discovery of David Heidebrecht). Dated Nov. 27, 2006.

Canadian Action No. 0601-08106, *Aram Systems Ltd.* v. *NovAtel Inc. and Patrick Fenton*, Amended Responses to Undertakings of Nicholas Schubert (Exhibit D-96 from Dec. 19, 2006 Examination for Discovery of P.C. Fenton), Nov. 28 and 29, 2006.

Canadian Action No. 0601-08106, *Aram Systems Ltd.* v. *NovAtel Inc. and Patrick Fenton*, USPTO office Action re Aram CIP filing, dated Feb. 8, 2007.

Canadian Action No. 0601-08106, *Aram Systems Ltd.* v. *NovAtel Inc. and Patrick Fenton*, USPTO office action re Deformation Monitoring Patent (Exhibit D-105 from Jun. 26, 2007 Examination for Discovery of P.C. Fenton), dated Mar. 28, 2007.

Canadian Action No. 0601-08106, *Aram Systems Ltd.* v. *NovAtel Inc. and Patrick Fenton*, Utility Patent Application Transmittal, dated Apr. 16, 2007.

Canadian Action No. 0601-08106, *Aram Systems Ltd.* v. *NovAtel Inc. and Patrick Fenton*, Correspondence from D. Brit Nelson to Patricia A. Sheehan Re: Declaration for Utility of Design Patent Application, dated Apr. 16, 2007.

Canadian Action No. 0601-08106, *Aram Systems Ltd.* v. *NovAtel Inc. and Patrick Fenton*, Correspondence from NovAtel EPO Patent Agent to EPO, dated May 11, 2007.

Canadian Action No. 0601-08106, *Aram Systems Ltd.* v. *NovAtel Inc. and Patrick Fenton*, U.S. Appl. No. 11/835,520 filed by Patrick Fenton, dated Aug. 8, 2007.

Canadian Action No. 0601-08106, *Aram Systems Ltd.* v. *NovAtel Inc. and Patrick Fenton*, Current Fenton EPO patent claims, dated Sep. 2007.

Canadian Action No. 0601-08106, *Aram Systems Ltd.* v. *NovAtel Inc. and Patrick Fenton*, Current Fenton Japanese patent claims, dated Sep. 2007.

Canadian Action No. 0601-08106, *Aram Systems Ltd.* v. *NovAtel Inc. and Patrick Fenton*, Current Fenton Norwegian patent claims, dated Sep. 2007.

Canadian Action No. 0601-08106, *Aram Systems Ltd.* v. *NovAtel Inc. and Patrick Fenton*, U.S. Appl. No. 7,269,095 issued to Donald Chamberlain et al., dated Sep. 11, 2007.

Deposition Transcript, Barfield, V.H., dated May 22, 2007.

Deposition Transcript, Fenton, P.C., dated Jun. 26, 2007.

Trial Transcripts, vol. 01.
Trial Transcripts, vol. 02.
Trial Transcripts, vol. 03.
Trial Transcripts, vol. 04.
Trial Transcripts, vol. 05.
Trial Transcripts, vol. 06.
Trial Transcripts, vol. 07.
Trial Transcripts, vol. 08.
Trial Transcripts, vol. 09.
Trial Transcripts, vol. 10.
Trial Transcripts, vol. 11.
Trial Transcripts, vol. 12.
Trial Transcripts, vol. 13
Trial Transcripts, vol. 14
Trial Transcripts, vol. 15
Trial Transcripts, vol. 16
Trial Transcripts, vol. 17
Trial Transcripts, vol. 18

Blewitt, Geoffrey, Article entitled Advances In Global Positioning System Technology for Geodynamics Investigations: 1978-1992, Contributions of Space Geodesy to Geodynamics: ?Technology Geodynamics 25, pp. 195-213.

Paper entitled Seismic Surveying under Tree Canopy Using Ashtech GG-24 GPS/Glonass Receivers and Waypoint's GrafNav Post-Processing Software, Mar. 2000.

Krasner, G.M. and Riley, W., Article entitled "Position Determination Using Hybrid GPS/Cellphone Ranging", Institute of Navigation Presentation, 2002.

Djuknic, G.M. and Richton, R.E., Article entitled "Geolocation and Assisted GPS", Feb. 2001, pp. 123-124.

NovAtel web page printout, "Post-processing Software Packages", www.novatel.com/products/waypoint.pps.htm.

Navcom web page printout, "Controller Software Solutions", www.navocmtech.com/products/software.cfm, circa 2004.

Lamance, J. et al., Article entitled "Assisted GPS: A Low-infrastructure Approach", printed from GPS World website, Mar. 1, 2002, pp. 1-5.

Behr, J.A. Powerpoint Presentation printout entitled Global Positioning System (GPS) Applications for Deformation Monitoring, Geotechnical Instrumentation for Field Measurements, University of Florida's Division of Continuing Education, Mar. 12, 2001, pp. 1-40.

Court of Appeal - Appeal Books (7 Volumes), dated Jan. 22, 2007 (Table of Contents).

Notice of Motion of NovAtel returnable May 16, 2007 seeking an Order adjourning the trial and completion of Examinations for Discovery and interlocutory proceedings, dated May 11, 2007.

Order of Associate Chief Justice Wittmann dated May 26, 2007, dated Jun. 1, 2007.

Written Brief of ARAM with respect to striking certain portions of the Expert Report of David Quinlan dated Jun. 15, 2007, dated Jul. 9, 2007.

Reply to Third Supplemental Notice to Admit Facts dated Aug. 17, 2007.

USPTO Office Action Summary re U.S. Appl. No. 10/693,298, dated Mar. 16, 2005.

E-mail from Nicholas Schubert to David Heidebrecht, dated Jun. 12, 2003.

Interview Summary re Jul. 27, 2006 conference call, dated Jul. 20, 2006.

Correspondence from NovAtel EPO Patent Agent to EPO, dated May 11, 2007.

Current Fenton EPO patent claims, dated Sep. 2007.

Current Fenton Japanese patent claims, dated Sep. 2007.

Current Fenton Norwegian patent claims, dated Sep. 2007.

Aram Book of Authorities dated Nov. 21. 2007.

Court of Appeal - Appeal Books (7 Volumes), dated Jan. 22, 2007.

Reasons for Judgment of the Honourable Mr. Justice Alan D. Macleod dated Jul. 23, 2008.

Civil Notice of Appeal dated Aug. 8, 2008.

Judgment Roll dated Aug. 12, 2008.

\* cited by examiner

METHOD FOR POSITIONING USING GPS IN A RESTRICTIVE COVERAGE ENVIRONMENT

CROSS-REFERENCE TO RELATED APPLICATIONS

The present application claims the benefit of U.S. Provisional Patent Application Ser. No. 60/588,099, which was filed on Jul. 15, 2004, by Thomas J. Ford, et al. for a METHOD FOR POSITIONING USING GPS IN A RESTRICTIVE COVERAGE ENVIRONMENT and is hereby incorporated by reference.

BACKGROUND OF THE INVENTION

1. Field of the Invention

The invention relates generally to GPS receivers, and in particular, to GPS receivers operating in restrictive coverage environments.

2. Background Information

BACKGROUND

Surveying or other measurement systems that use fixed-position GPS receivers for precise position information are hindered and, in some cases, prevented from operating in "restrictive coverage" environments. Restrictive coverage environments are those in which direct GPS satellite signals are corrupted by indirect signals (multipath) and, in some cases, particular direct signals are entirely blocked. An example of a restrictive coverage environment is one in which obstructions, such as foliage, landscape, buildings and so forth, obscure portions of the sky views of the respective GPS receivers and/or provide large multipath signals to the GPS receivers.

In a restrictive coverage environment, the set of signals received by the GPS receiver will include some corrupted signals as well as some purely indirect ones, that is, reflected signals that correspond to the blocked line-of-sight signals. The receiver operating in a conventional manner uses all of the received signals to produce positions, and may thus produce positions that are accurate only to within a number of meters. Also, there will be times when the GPS receiver does not have a sufficient number of GPS satellites in view to even compute a position. Accordingly, the surveying or other measurement systems may not be able to determine the position (latitude, longitude and height) to within the required tolerances for some applications.

As described below, we have come up with a way to process the range information provided by the GPS receivers in a restricted coverage environment, to determine the respective positions of the GPS receivers to within the required tolerances.

SUMMARY OF THE INVENTION

The invention is a system that determines GPS positions to within tight tolerances by batch processing range information from GPS receivers. The system includes a base GPS receiver with a substantially unobstructed view of the sky. The base GPS receiver and the other GPS receivers in the measurement area produce range information based on the satellite signals that the respective receivers can track at a given time, and provide the range information to a data recording and processing center. The range information includes both code and carrier measurements for each of the signals that are being tracked by the respective GPS receivers. The center collects the range information over an extended period of time, for example, hours, days or weeks, and then batch processes the collected information, to calculate the precise latitude, longitude and height of the receiver. The center also calculates the quality of the collected range information, to ensure that the information used in the batch position calculations is sufficiently reliable, as discussed in more detail below.

As long as a given GPS receiver has tracked at least two satellites simultaneously for 3 or 4 relatively short time intervals at different sky locations during the extended period, the batch processing of the range information produces the position of the GPS receiver to within the relatively tight tolerances that are required for applications such as surveying or seismic measuring. The batch processing allows the system to calculate the precise position of the GPS receiver without requiring that the GPS receiver continuously track the GPS satellite signals from multiple satellites and/or track the signals from the same set GPS satellites.

The data processing center batch processes the range data collected from a given GPS receiver over the extended period, to compute a single position, i.e., latitude, longitude and height, and an associated position covariance. The batch processing involves multiple passes through the collected range data, with a first pass using all of the collected data, that is, all of the pseudorange and carrier phase information, to produce a global position estimate that is expected to be accurate to within 30 to 60 meters. As discussed, the accuracy is adversely affected by the overall quality of the range data.

As a next pass through the data, the data recording and control center refines the calculated position and position covariance using only the carrier phase measurements, which are less susceptible to multipath interference. The receiver starts with the estimated position and position covariance from the first pass and, in what is a computation intensive manner, estimates carrier cycle ambiguities to determine updated estimated positions and associated position covariances. The estimated position and the associated position covariance are updated at every code epoch in which two or more satellites are in view of the receiver, that is, when double differences can be calculated to estimate the carrier cycle ambiguities. The accuracy of the position estimate at the end of the second pass is expected to be within 3 to 6 meters, with most of the error attributable to the height component.

The third pass through the data holds the position fixed to the best estimate from pass two and looks for growth in the residuals calculated using the carrier phase measurements and the estimated ambiguities that are based on double differences using measurements from the base GPS receiver. The processing then selects for further processing the data that are associated with little or no residual growth, and flags as invalid the data associated with relatively large residual growth. The processing may also selectively weight various data used in the further processing.

The processing then recalculates the estimated position based on the results of the third pass. The system eliminates from the calculations the measurements that are flagged as invalid and assigns appropriate weights to the remaining measurements, to produce a new position estimate and an associated position covariance.

The processing system next holds the position and position covariance fixed at the new estimates and repeats the third pass, that is, the processing step of determining the validity of and weightings for the measurements based on the associated residuals. In this step the system may accept as valid particular measurements that showed perceived movement relative to the prior estimated position and position covariance but do not with respect to the new estimates. The processing system then determines a next estimated position and associated position covariance using the updated weighting and validity determinations, and continues iterating in this manner, i.e., determining new weightings and a next estimate of position, until the estimated position changes by less than a predetermined threshold between iterations. The result is a position that is accurate to within the tolerances required for making the desired measurements.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
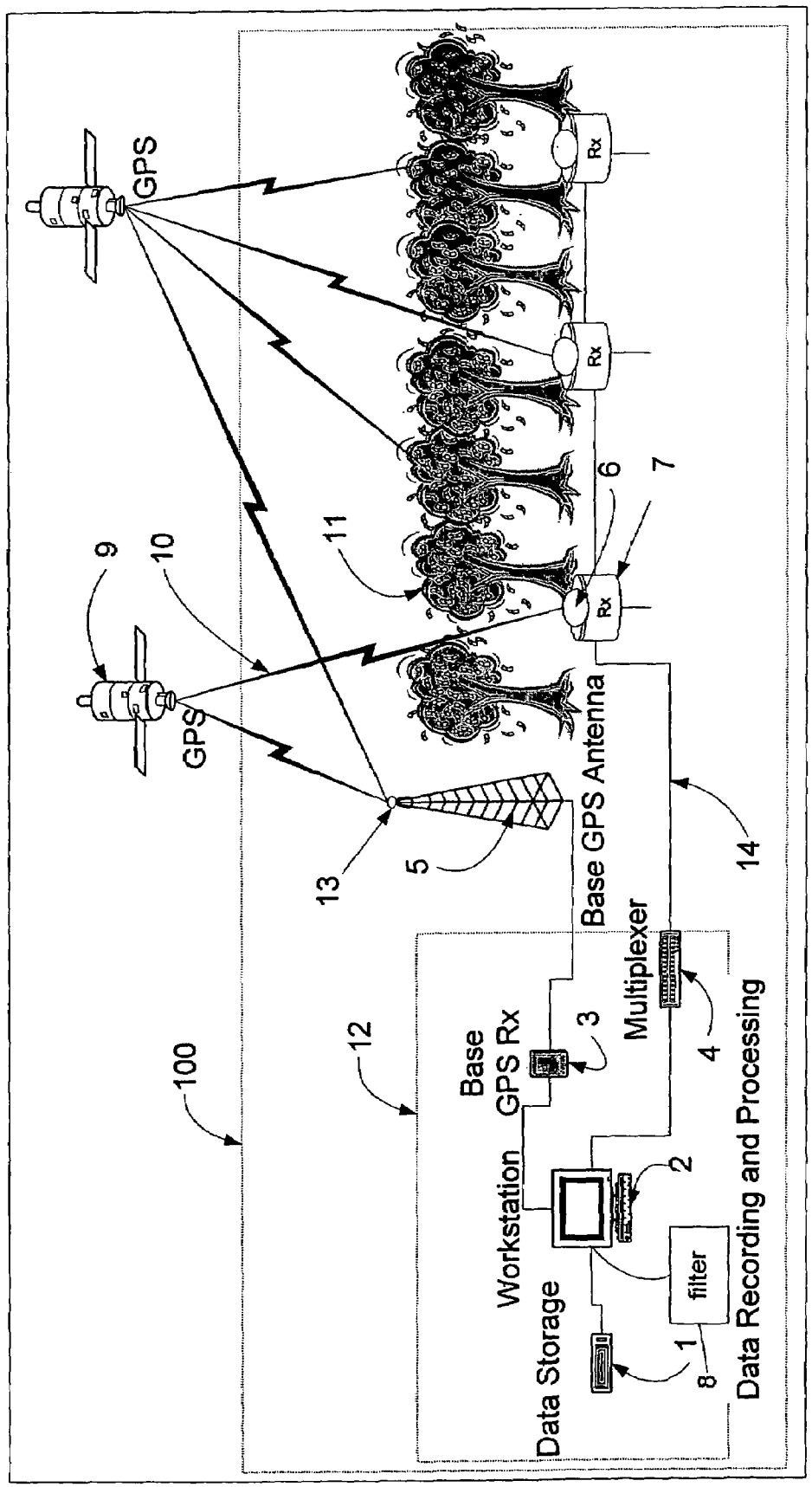
FIG. 1 is a functional block diagram of a system constructed in accordance with the current invention.

Referring now to FIG. 1, a positioning system 100 includes a plurality of GPS receivers 6 that supply range information, that is, pseudoranges and carrier measurements, to a data recording and control center 12 through signal receivers 7 that are located in selected locations over a site of interest. The signal receivers 7 are connected to the center by cables 14. The center 12 includes one or more workstations 2 and data storage devices 1 that retain and process the range information. The signals from various cables 14 (only one of which is shown in the drawing) are supplied to the one or more workstations 2 through a multiplexer 4, which operates in a conventional manner. The GPS receivers 6 are sometimes referred to herein as "remote receivers."

The data recording and control center 12 further includes a base GPS receiver 3 that receives signals from various GPS satellites 9 using a base GPS antenna 13, which is positioned to have a clear view of the sky. An elevated tower 5 may be necessary to provide the GPS antenna 13 with a clear view to the sky. As depicted in the drawing, certain or all of the GPS receivers 6 are located under or near various trees 11, such that at any given time the signals 10 from GPS satellites 9 in certain sky locations may be unavailable or weakened at various GPS receivers.

The base GPS receiver 3 acquires and tracks the signals 10 from each of the GPS satellites 9 in view. The GPS receivers 6 produce range information based on the satellite signals that the respective receivers can track at a given time, and provide the range information via the signal receivers 7 to the data recording and control center 12. As described in more detail below with reference to FIG. 2, the center collects the range information over an extended period of time, for example, hours, days or weeks, and then batch processes the collected information, to calculate the precise latitude, longitude and height of the receiver. The center also calculates the quality of the collected range information, to ensure that the information used in the batch position calculations is sufficiently reliable.

As long as a given GPS receiver 6 has tracked at least two satellites simultaneously for 3 or 4 relatively short time intervals at different sky locations during the extended period, and the GPS receiver has not moved during the data collection period, the batch processing of the range information calculates the position of the GPS receiver to within the relatively tight tolerances required for applications such as seismic measurement and surveying. The batch processing thus allows the system to calculate the precise position of the GPS receiver without requiring that the receiver continuously track the GPS satellite signals and/or track the signals from the same set of GPS satellites.

The data recording and control center 12 batch processes the range information, making multiple passes through the data using a floating ambiguity filter 8. As discussed in more detail below, the filter operates in certain of the passes with a position and position covariance matrix that is not reset when the carrier ambiguities are reset. This allows the filter to use the full history of observational information, here the carrier information, to estimate the stationary position of a given receiver. The filter is thus not limited to using observational information associated with discrete blocks of continuous carrier phase measurements.

Figure 2:
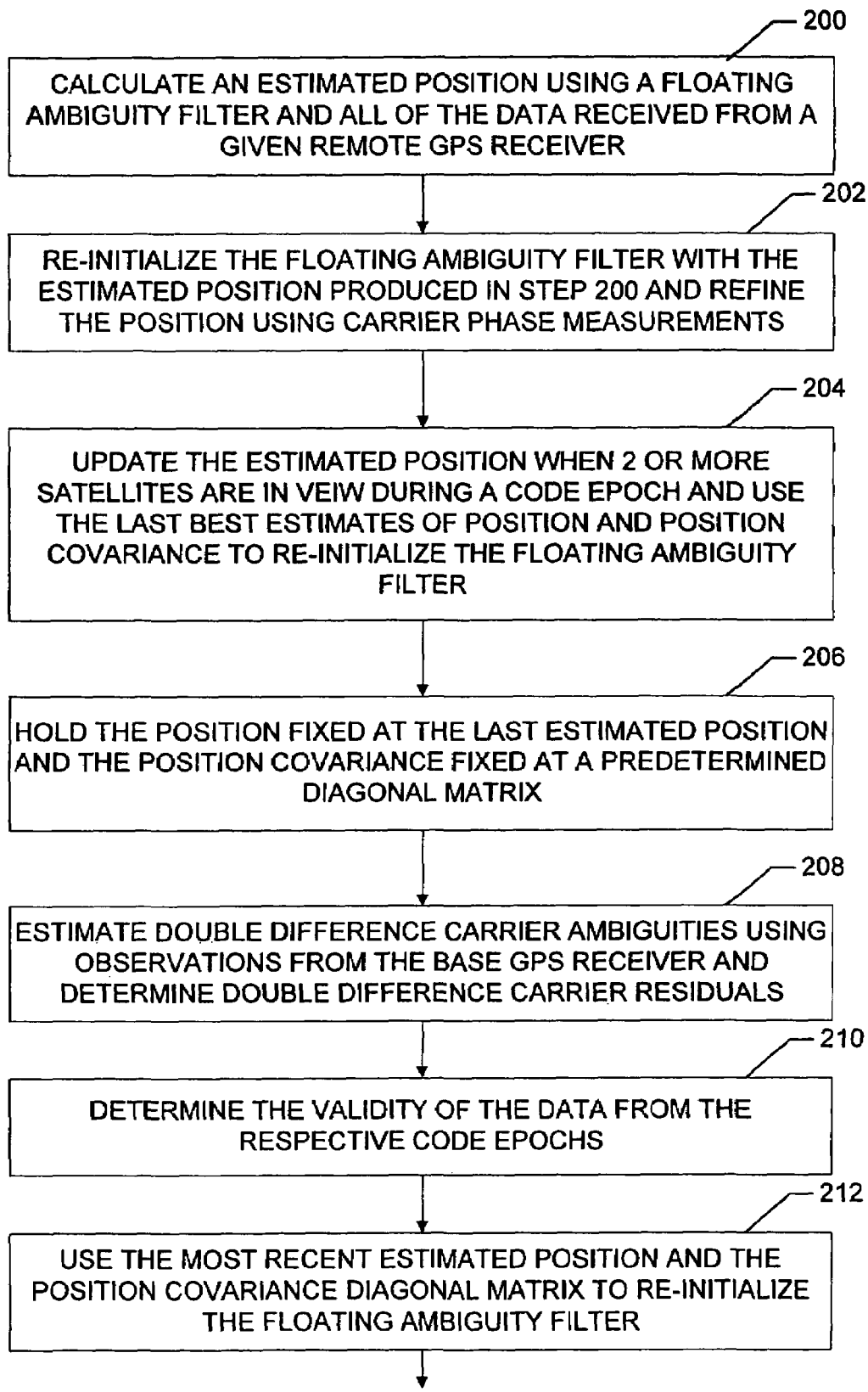
FIG. 2 is a flow chart of the batch processing operations performed by the system of FIG. 1.
Figure 2:
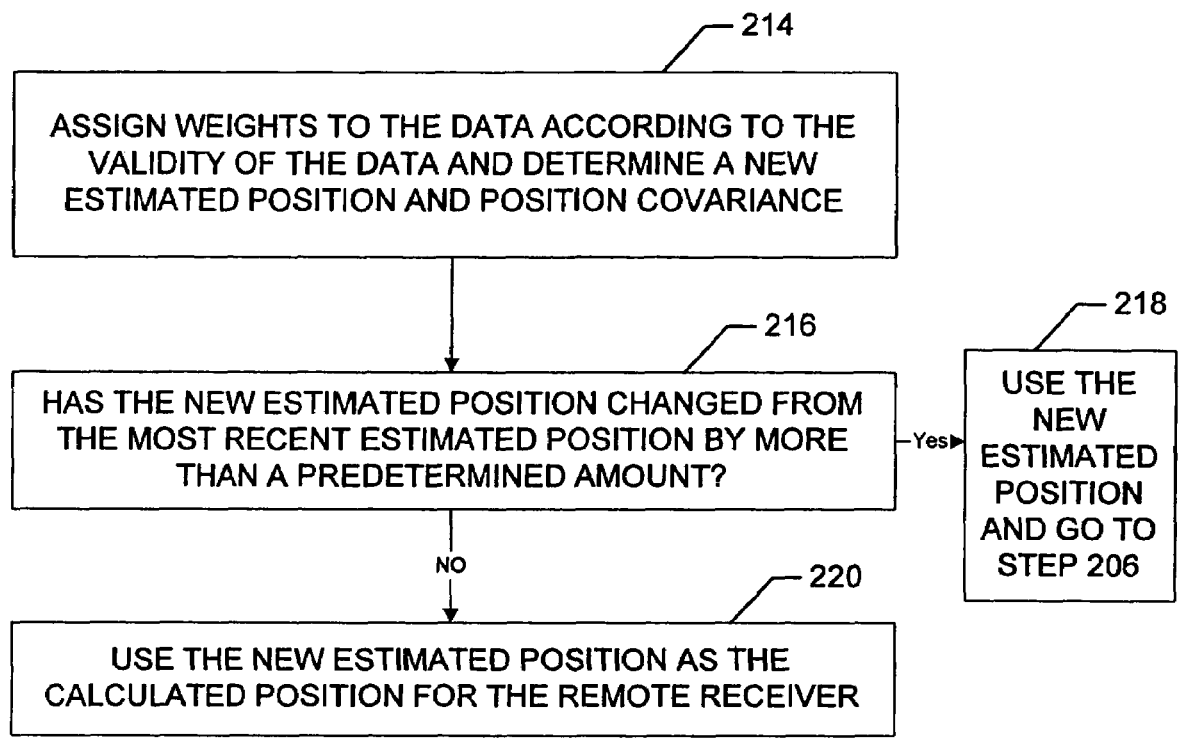

Referring also to FIG. 2, the batch processing includes the following passes through the collected range information:

Pass 1: All of the available data from a given GPS receiver 6 (pseudoranges and carrier phases) are processed in a known manner using the floating ambiguity filter 8, to produce a first estimated position (Step 200). The output of this pass is a position with an expected accuracy of between 30 and 60 meters. The data is produced based on signals from the satellites that are in the view of the receiver at various times over an extended time period, that is, over a number of hours, days, and so forth. Generally, it is expected that range data will be collected over a period of between 8 and 24 hours. The remote GPS receiver's restricted view of the sky, because of foliage or other partial coverage, may result in the receiver having the same set of satellites in view over only a small portion of the extended period and/or having only one satellite in view at particular times. Further, some of satellite signals may be distorted by large multipath components attributed to signals that are reflected by the obstructions that obscure the skyviews of the GPS receivers and/or nearby structures, and so forth. Accordingly, certain of the data may not be particularly reliable.

Pass 2: The floating ambiguity filter 8 is initialized with the estimated position derived during pass 1. In this pass the pseudorange measurements are not used, and a refined position is computed using only the carrier phase measurements (Step 202). The position and position covariance are updated every code epoch during which two or more satellites are available to, that is, in the view of, the receiver. The filter is reset after a cycle slip or whenever fewer than two satellites are available for at least one code epoch. Each time the filter is reset, the system uses the last best estimates of position and position covariance as initial values (Step 204). In this manner, the position information is retained while the ambiguity information is essentially discarded. The accuracy of the final Pass 2 position is between 3 and 6 meters, with most of the error associated with the height component.

Pass 3: The position and position covariance are held fixed in this pass, such that all of the observational carrier data may be used (Step 206). The fixed position is the final position derived in Pass 2. The position covariance matrix is held to be a diagonal matrix, with very small elements (i.e. 0.00000001 m$^2$). With the position held fixed, the system estimates double difference carrier ambiguities using observations from the base receiver, and determines associated double difference carrier residuals (Step 208). Based on an analysis of residuals and their growth, the data are treated as invalid or weighted accordingly (Step 210).

In this pass, the floating ambiguity filter is modified to reset carrier ambiguities only if a carrier cycle slip, that is, a loss of lock, is detected. The residuals are allowed to grow without limit, as long as the carrier measurements are continuous. The residuals generated in this pass are used to create a series of signal quality indicators that are, in turn, to be used in the subsequent pass. The signal quality indicators allow appropriate weighting values to be assigned to the carrier measurements from each satellite at each code epoch. The carrier measurements may be assigned full weight if the following conditions are met:

a) The time since the last cycle slip exceeds a first predetermined threshold.

b) The sum of squares of the residuals of the carrier measurement falls below a normalized threshold over an interval of continuously available measurements.

c) The growth rate of the sum of squares of the residuals does not exceed a second predetermined threshold over an interval of continuously available measurements.

If all of the conditions are not met, the series of carrier observations for the entire interval between cycle clips, or lock breaks, are flagged as invalid. If a series of carrier measurements for an interval between cycle slips is deemed valid, that is, the conditions are met, some portion of the measurements in that interval (not including the measurements at the end points of the interval) may be de-weighted. The de-weighting is applied to prevent correlated multipath errors, i.e., non-white noise, on the continuous measurements from inappropriately affecting the estimated position solution. The de-weighting may, for example, take the form of using only a portion of the measurements over a particular code epoch, i.e., one out of every four measurements, or using a larger standard deviation in the associated calculations.

The system thus creates a weighting table (not shown), with flags for each PRN code at each code epoch. These flags direct how the measurements will be used in a subsequent pass through the data. The flags may simply be "valid" or "invalid," or they may specify to what extent the measurements should be de-weighted.

Pass 4: The last estimated position and position covariance are used to initialize the floating ambiguity filter for this pass (Step 212). The filter then uses the weighting table to assign weights to the carrier observations it uses, and eliminates from the calculations those observations flagged as "invalid." The system produces a new estimated position and position covariance (Step 214), which is then subject to the validation described in Pass 5 below.

Pass 5 and above: Pass 5 is the same as Pass 3, using the last estimated position as the fixed position (Step 218). The double differenced carrier residuals are thus computed and tested as described in Pass 3, and the validity or non-validity of the respective observations are reestablished. A new weighting table is then created and a new estimated position and position covariance are calculated in the same manner as Pass 4. The system then determines if the newly calculated position differs from the last calculated position by more than a predetermined threshold (Step 216). If so, the system repeats Pass 5 (Step 218). Otherwise, the system uses the new estimate as the calculated position (Step 220). For example, when the height, which is the value in which most of the error occurs changes by less than 0.05 m between iterations, the solution is deemed to have converged and processing is ended.

Test Description

To test the process described above, an extremely restricted test environment was selected. The test site was the UBC Malcolm Knapp Research Forest in Maple Ridge, BC. A total of 8 NovAtel OEM4-G2L receivers were deployed in series in an old growth section of the forest. The forest was very dense, with very tall trees, over 50 meters in height, and thick underbrush. The moisture level was also very high, as it rained throughout the majority of the test, saturating the foliage with water. The rover GPS receiver antennae were set up very close to the ground. They were mounted on threaded rod, within 3 inches of the ground. A 22 hour data set was collected. A NovAtel OEM4G2L base station was set up in a clearing with an unobstructed view of the sky.

In addition to providing an excellent coverage environment, the UBC research forest also has an existing survey network in it, established by FERIC as a test range. Since conventional GPS performance is quite poor, particularly in height, under heavy foliage, an independent reference for the receiver positions was required. A traditional survey was performed, working off of the FERIC test range points, using a total station for the horizontal positioning and a spirit level for the vertical component. The FERIC survey network is supposed to be accurate to 10 cm horizontally, with heights given to the even meter only. The horizontal survey performed for this test agreed to the FERIC network to 0.20 m or better. The level loop closed to 0.017 m, so the vertical control should be better than 0.01 m at each point. All positional errors given in this document are with respect to this ground survey.

Test Results

The 8 rover GPS receivers were positioned in areas with heavy foliage canopies, in ravines, in proximity to large trees and/or stumps, and so forth. Accordingly, the system was tested with the receivers in environments in which multipath signals were prevalent and sky views in most instances were limited. Table 1 summarizes the positional errors of the 8 rover GPS receivers.

TABLE 1

Position Errors Resulting from the Multiple Pass Process

| Rover | North Error (m) | East Error (m) | Height Error (m) | Total Positional Error (m) |
|---|---|---|---|---|
| A | 0.04 | −0.05 | 0.07 | 0.09 |
| D | 0.05 | 0.33 | 0.36 | 0.49 |
| E | −0.33 | 0.25 | 0.63 | 0.76 |
| F | −0.55 | 0.12 | 1.14 | 1.27 |
| G | −0.17 | −0.05 | 0.13 | 0.22 |
| H | −0.27 | −0.27 | 0.39 | 0.54 |
| I | −0.48 | 0.19 | 0.84 | 0.98 |
| J | −0.07 | 0.23 | 0.63 | 0.67 |

While the horizontal positioning results are better than what would be achieved with conventional processing techniques, the vertical results are most impressive, with an average height error of 0.52 m.

Table 2 summarizes the height errors and the number of passes required to achieve them.

TABLE 2

Height Errors and Number of Passes Performed

| Rover | Height Error (m) | Number of Passes |
|---|---|---|
| A | 0.065 | 2 |
| D | 0.361 | 4 |
| E | 0.633 | 8 |
| F | 1.136 | 8 |
| G | 0.128 | 4 |

TABLE 2-continued

Height Errors and Number of Passes Performed

| Rover | Height Error (m) | Number of Passes |
|-------|------------------|------------------|
| H     | 0.388            | 6                |
| I     | 0.836            | 8                |
| J     | 0.625            | 8                |

The level of improvement can be seen in the convergence of the height estimate from pass to pass, as shown in Table 3.

TABLE 3

Height Errors at end of Each Pass

| Rover | Pass 1 | Pass 2 | Pass 4 | Pass 6 | Pass 8 |
|-------|--------|--------|--------|--------|--------|
| A     | 0.794  | 0.065  | —      | —      | —      |
| D     | 12.911 | 0.408  | 0.361  | —      | —      |
| E     | 5.752  | 0.903  | 0.565  | 0.621  | 0.633  |
| F     | 12.123 | 1.89   | 1.48   | 1.141  | 1.136  |
| G     | 13.148 | 0.086  | 0.128  | —      | —      |
| H     | 22.519 | 0.451  | 0.384  | 0.388  | —      |
| I     | 12.963 | 1.345  | 1.111  | 0.884  | 0.836  |
| J     | 12.117 | 0.832  | 0.780  | 0.651  | 0.625  |

As can be seen from the text results, the system calculates GPS positions that are within tolerances associated with applications such as surveying, seismic measuring, even for receivers that are located in what can be characterized as an extremely restrictive coverage environments. The number of passes through the data provided by a given receiver depends on the conditions at the location of the receiver, and thus, on the underlying reliability of the data.

The foregoing description has been limited to a specific embodiment of this invention. It will be apparent, however, that variations and modifications may be made to the invention, with the attainment of some or all of its advantages. For example, the base GPS receiver observation data may be supplied by two or more GPS receivers that have partial views of the sky and together have a clear view of the sky, the position covariance may be fixed at other values that represent predetermined small thresholds for relative perceived movement, and so forth. Therefore, it is the object of the appended claims to cover all such variations and modifications as come within the true spirit and scope of the invention.

What is claimed is:

1. A GPS system including:
   a base GPS receiver with an antenna that has a clear view of the sky;
   one or more remote GPS receivers;
   a data processing subsystem that collects range data from the base and remote GPS receivers over a plurality of hours and calculates the positions of the respective GPS receivers, the data processing center batch processing the data received from the respective remote receivers in multiple passes through the data using floating ambiguity filters for processing carrier phase measurements included in the range data, the floating ambiguity filters after the first pass being initialized with estimated positions that have been previously calculated.

2. The GPS system of claim 1 wherein the data processing center, for a second pass through the data, calculates an estimated position using the carrier phase measurements that are included in the range data.

3. The GPS system of claim 2 wherein the data processing center
   updates the position and position covariance of the floating ambiguity filter at code epochs in which the remote GPS receiver has two or more GPS satellites in view, and
   re-initializes the position and position covariance of the floating ambiguitity filter when a cycle slip occurs or when fewer than two satellites are in view for at least one code epoch.

4. The GPS system of claim 2 wherein the data processing center further, in one or more subsequent passes though the data,
   holds the position and position covariance fixed and determines the validity of the range data for respective code epochs, and
   uses only data that are determined to be valid in the calculation of the estimated position and position covariance.

5. The GPS system of claim 4 wherein the data processing center uses as the fixed position covariance a diagonal matrix with elements that correspond to small fractions of a square meter.

6. The GPS system of claim 4 wherein the data processing center assigns weights to the data.

7. The GPS system of claim 4 wherein the data processing center determines that the range data are valid based on sums of squares of residuals of carrier phase measurements that are double differenced with corresponding measurements made by the base GPS receiver.

8. The GPS system of claim 7 wherein the data processing center estimates double difference carrier cycle ambiguities and resets the carrier ambiguities if a carrier cycle slip is detected.

9. A method of calculating GPS position in a restrictive coverage environment, the method including the steps of:
   receiving range data associated with a clear view of the sky from one or more base GPS receivers;
   receiving range data from one or more remote receivers that have restricted views of the sky;
   determining the position of a given remote receiver by batch processing the range data received from the one or more base GPS receivers and the remote receiver over a plurality of hours in multiple passes through the data using a floating ambiguity filter for processing carrier phase measurements included in the range data, the floating point filter after a first pass through the data being initialized with a previously calculated estimated position.

10. The method of claim 9 wherein the step of batch processing includes, for a second pass through the data, calculating the estimated position using the carrier phase measurements that are included in the range data.

11. The method of claim 10 wherein the step of batch processing further includes
    updating the position and position covariance of the floating ambiguity filter at code epochs in which the remote GPS receiver has two or more GPS satellites in view, and
    re-initializing the position and position covariance of the floating ambiguity filter when a cycle slip occurs or whenever fewer than two satellites are in view for at least one code epoch.

12. The method of claim 10 wherein the step of batch processing further includes in one or more subsequent passes through the data
    holding the position and position covariance fixed and determining the validity of the range data for respective code epochs, and using only data that are determined to be valid in the calculation of the estimated position and position covariance.

13. The method of claim 12 wherein the step of batch processing further includes using as the fixed position covariance a diagonal matrix with elements that correspond to a small fraction of a square meter.

14. The method of claim 12 wherein the step of batch processing further includes assigning weights to the data.

15. The method claim 12 wherein the step of batch processing further includes determining that the range data are valid based on sums of squares of residuals of the carrier phase measurements that are double differenced with corresponding measurements made by the one or more base GPS receivers.

16. The method of claim 15 wherein the step of batch processing further includes estimating double difference carrier cycle ambiguities and resetting the carrier ambiguities if a carrier cycle slip is detected.

17. The method of claim 15 wherein the step of batch processing further includes determining that the range data is valid if
a. the time since the last cycle slip exceeds a first predetermined threshold,
b. the sum of squares of the residuals of the carrier measurement falls below a normalized threshold over an interval of continuously available measurements, and
c. the growth rate of the sum of squares of the residuals does not exceed a second predetermined threshold over an interval of continuously available measurements.

18. The method of claim 9 wherein the step of receiving range data associated with a clear view of the sky includes receiving range data from a plurality of GPS receivers that together have a clear view of the sky.

19. The method of claim 9 wherein the step of receiving range data associated with a clear view of the sky includes receiving range data from a single base GPS receiver that has a clear view of the sky.

* * * * *